(12) United States Patent
Kamon

(10) Patent No.: US 7,880,778 B2
(45) Date of Patent: Feb. 1, 2011

(54) IMAGE PICKUP APPARATUS, CHARACTERISTIC VARIATION CORRECTION APPARATUS AND DATA PROCESSING METHOD

(75) Inventor: Koichi Kamon, Otokuni-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1184 days.

(21) Appl. No.: 11/515,956

(22) Filed: Sep. 5, 2006

(65) Prior Publication Data

US 2007/0052830 A1    Mar. 8, 2007

(30) Foreign Application Priority Data

Sep. 8, 2005    (JP) ............................. 2005-260439

(51) Int. Cl.
*H04N 5/235* (2006.01)
*H04N 5/335* (2006.01)

(52) U.S. Cl. ..................... 348/241; 348/364; 348/222.1; 348/294; 348/308

(58) Field of Classification Search ................. 348/241, 348/244, 294, 607, 627, 308, 222.1, 221.1, 348/364, 362, 187, 180; 358/3.01, 504; 382/275
See application file for complete search history.

(56) References Cited

U.S. PATENT DOCUMENTS 6,191,408 B1 * 2/2001 Shinotsuka et al. ...... 250/208.1
7,714,928 B2 * 5/2010 Kamon et al. ............... 348/362

FOREIGN PATENT DOCUMENTS

JP        11-298799 A    10/1999
JP        2000-175108 A  6/2000

* cited by examiner

*Primary Examiner*—David L Ometz
*Assistant Examiner*—Jean W Désir
(74) *Attorney, Agent, or Firm*—Sidley Austin LLP

(57) ABSTRACT

An image pickup apparatus having an image pickup device structured by a plurality of pixels having different photoelectric conversion characteristics different from each other on each side of an inflection point, correcting an error of the photoelectric conversion characteristics, thereby contributing to realization of high image quality will be provided. In the image pickup apparatus having an image pickup device structured by a plurality of pixels having different photoelectric conversion characteristics different from each other on each side of the inflection point, on the basis of the inflection point of the standard photoelectric conversion characteristic and correction data, whether or not to execute a correction using the correction data to the imaged data of the pixels and whether or not to execute characteristic transformation using the characteristic transformation section to the imaged data of the pixels are decided.

15 Claims, 17 Drawing Sheets

IMAGE PICKUP APPARATUS, CHARACTERISTIC VARIATION CORRECTION APPARATUS AND DATA PROCESSING METHOD

This application is based on Japanese Patent Application No. 2005-260439 filed on Sep. 8, 2005, in Japanese Patent Office, the entire content of which is hereby incorporated by reference.

TECHNICAL FIELD

The present invention relates to an image pickup apparatus and more particularly to an image pickup apparatus having an image pickup device structured by a plurality of pixels having a plurality of different photoelectric conversion characteristics different from each other on each side of an inflection point.

BACKGROUND

In a conventional image pickup apparatus having an image pickup device structured by a plurality of pixels having different photoelectric conversion characteristics different from each other on each side of the inflection point, for example, an image pickup device (hereinafter, referred to as linear log sensor) having a linear photoelectric conversion characteristic on the low illumination intensity side and a logarithmic photoelectric conversion characteristic (hereinafter, referred to as linear log characteristic) on the high illumination intensity side, due to characteristic variations of the device structured by the pixels, the inflection point may be varied and the image quality is adversely affected to no small extent.

Therefore, as an inflection point variation correction method, a method for storing the photoelectric conversion characteristic of all the pixels and the standard photoelectric conversion characteristic and correcting imaged image data of all the pixels to data fitted to the standard photoelectric conversion characteristic is proposed (for example, refer to Japanese Unexamined Laid-Open Patent Publication H11-298799). Further, in the Japanese Laid-Open Patent Publication, a method for storing the ratio of the temperature coefficient to the ambient temperature of all the pixels to the standard temperature coefficient and correcting the temperature characteristic on the basis of the ambient temperature detected by the temperature sensor is described.

Furthermore, a method for correcting a signal offset in the logarithmic characteristic area to an arbitrary offset, then correcting a signal in the linear characteristic area, and detecting the temperature of the image pickup device and correcting the temperature is proposed (for example, refer to Japanese Unexamined Laid-Open Patent Publication 2000-175108).

However, in the method of Japanese Unexamined Laid-Open Patent Publication H11-298799, for example, in the photoelectric conversion characteristic of all the pixels of the image pickup device structured by 2000000 pixels used in an inexpensive digital camera, to divide the overall illumination intensity area into 1000 parts and store each of them as 16-bit (2-byte) data, a huge memory exceeding a personal computer 2,000,000×1000×2=4 giga bytes long is necessary and it cannot be applied to an image pickup apparatus such as a digital camera. Further, to compare the image data of all the pixels with the stored photoelectric conversion characteristic and correct the image data to data fitted to the standard photoelectric conversion characteristic from the results thereof, very many calculations are necessary, and a lot of time is taken in the calculation, so that it cannot be applied to an image pickup apparatus such as a digital camera.

Further, in the method of Japanese Unexamined Laid-Open Patent Publication 2000-175108, for example, in the two photoelectric conversion characteristic graphs with the inflection points shifted (inflection points 901$d$ and 903$d$) shown in FIG. 16, when intending to allow one photoelectric conversion characteristic 903 (having a linear characteristic 901$a$ and a logarithmic characteristic 903$c$ bounded by each other with the inflection point 903$d$) to execute a parallel movement 905 in the direction of the axis of ordinate of the drawing so as to fit it to another standard characteristic 901 (having the linear characteristic 901$a$ and logarithmic characteristic 903$c$ bounded by each other with the inflection point 901$d$), the part of the logarithmic characteristic 903$c$ having illumination intensity of the image pickup surface higher than Lm coincides with the logarithmic characteristic 901$c$, though a part 903$b$ of the logarithmic characteristic 903$c$ having illumination intensity of the image pickup surface lower than Lm becomes a logarithmic characteristic 907$b$ and does not coincide with a part 901$b$ of the linear characteristic 901$a$ having illumination intensity of the image pickup surface higher than Ln. Namely, the shifts of the inflection points cannot be corrected, and the error between the two photoelectric conversion characteristics cannot be corrected. Here, FIG. 16 is a schematic view showing the two photoelectric conversion characteristic graphs with the inflection points shifted (the inflection points 901$d$ and 903$d$), and the axis of abscissa is a logarithmic axis indicating illumination intensity L of the image pickup surface, and the axis of ordinate is a linear axis indicating photoelectric conversion output VP, and the illumination intensity of the image pickup surface at the inflection point 901$d$ is Lm, and the photoelectric conversion output is Vthm, and the illumination intensity of the image pickup surface at the inflection point 903$d$ is Ln, and the photoelectric conversion output is Vthn.

SUMMARY

The present invention was developed in view of the foregoing, and an object of the present invention is to provide an image pickup apparatus having an image pickup device structured by a plurality of pixels having different photoelectric conversion characteristics different from each other on each side of the inflection point, correcting an error between the photoelectric conversion characteristics of the pixels and the standard photoelectric conversion characteristic, thereby contributing to realization of high image quality.

In view of forgoing, one embodiment according to one aspect of the present invention is an image pickup apparatus, comprising:

an image pickup device having a plurality of pixels which have a plurality of different photoelectric conversion characteristics different from each other on each side of an inflection point; and a characteristic variation correction section which corrects an error of the photoelectric conversion characteristic of the pixels, the error being a distance from standard photoelectric conversion characteristic, wherein the characteristic variation correction section includes:

a correction data storing section which stores correction data;

an error correction section which corrects the imaged data by using the correction data;

a characteristics transformation section which transforms imaged data converted by one of the different photoelectric conversion characteristics into imaged data fitted to another of the different photoelectric conversion characteristics;

an correction manner decision section which decides, based on an inflection point of the standard photoelectric conversion characteristic and the correction data, whether the imaged data is corrected by using the correction data or not and whether the imaged data is transformed by using the characteristics transformation section or not.

According to another aspect of the present invention, another embodiment is a characteristic variation correction apparatus, in an image processing apparatus in which imaged data from a image pickup device including a plurality of pixels having a plurality of different photoelectric conversion characteristics different from each other on each side of an inflection point, for correcting an error of the photoelectric conversion characteristic of the pixels, the error being a distance from standard photoelectric conversion characteristic, comprising:

a correction data storing section which stores correction data;

an error correction section which corrects the imaged data by using the correction data;

a characteristics transformation section which transforms imaged data converted by one of the different photoelectric conversion characteristics into imaged data fitted to another of the different photoelectric conversion characteristics;

an correction manner decision section which decides, based on an inflection point of the standard photoelectric conversion characteristic and the correction data, whether the imaged data is corrected by using the correction data or not and whether the imaged data is transformed by using the characteristics transformation section or not.

According to another aspect of the present invention, another embodiment is a data processing method of imaged data, comprising the steps of:

imaging by using an image pickup device including a plurality of pixels having a plurality of different photoelectric conversion characteristics differ from each other on each side of an inflection point; and correcting an error between the photoelectric conversion characteristics of the pixels and a standard photoelectric conversion characteristic, wherein the step of correcting an error includes the steps of:

correcting the imaged data of the pixels using correction data;

transforming imaged data of the pixels converted by one of the different photoelectric conversion characteristics to imaged data fitted to another of the different photoelectric conversion characteristics; and deciding, based on an inflection point of the standard photoelectric conversion characteristic and the error correction data, whether the imaged data is corrected by using the error correction data or not and whether the imaged data is transformed or not.

DETAILED DESCRIPTION OF THE PREFERRED EMBODIMENTS

Hereinafter, the embodiments of the present invention will be explained with reference to the accompanying drawings.

Firstly, a digital camera 1 which is an embodiment of the image pickup apparatus relating to the present invention will be explained by referring to FIGS. 1(a), 1(b), and 2.

Figure 1A:
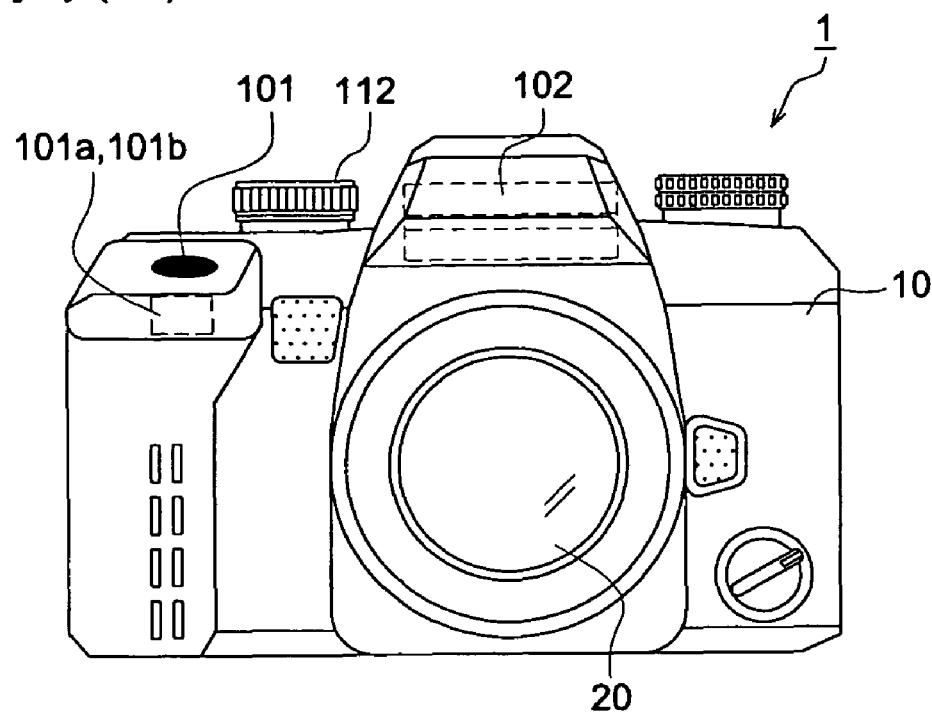
FIGS. 1(a) and 1(b) are external schematic views of the digital camera which is an example of the image pickup apparatus relating to the present invention.
Figure 1B:
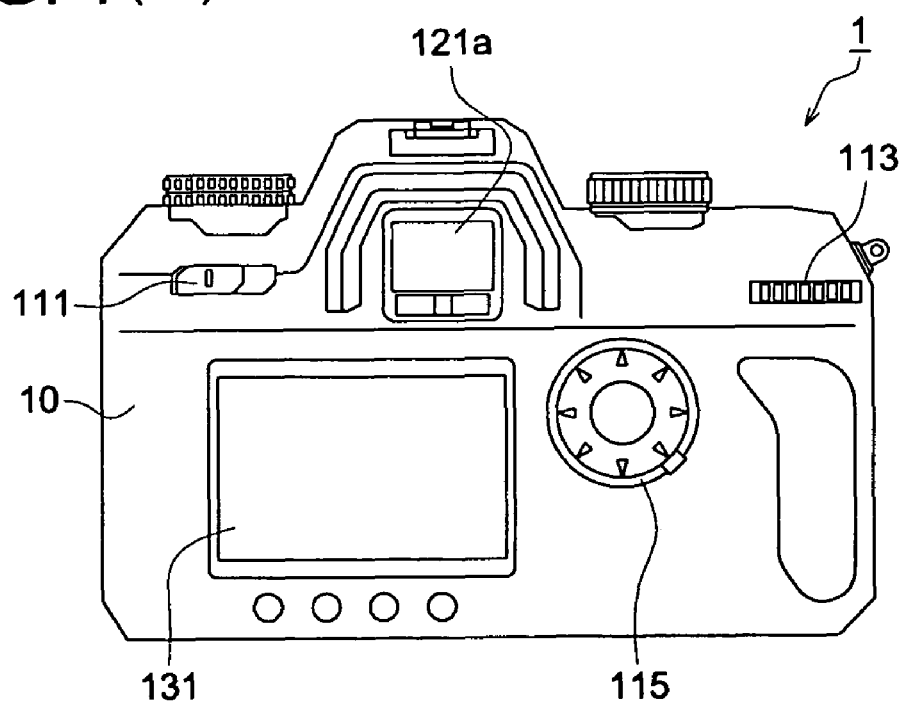

FIGS. 1(a) and 1(b) are external schematic views of the digital camera 1, and FIG. 1(a) is a front view, and FIG. 1(b) is a rear view.

In FIG. 1(a), on the front of a body 10, an interchangeable lens 20 is attached. On the top of the body 10, a release button 101 which is an operation member for imaging is installed and inside the body 10 and at the lower part of the release button 101, a two-stage switch composing an AF switch 101a operating at the first stage of pressing of the release button 101 and a release switch 101b operating at the second stage of pressing of the release button is arranged. Further, at the upper part of the body 10, a flash 102 is built in and a mode setting dial 112 for setting the operation mode of the digital camera 1 is arranged.

In FIG. 1(b), on the rear of the body 10, a power source switch 111 for turning on or off the power source of the digital camera 1, a change dial 113 for changing various set conditions of the camera, a jog dial 115 structured by five upper, lower, left, right, and center switches for deciding various settings in the respective operation modes of the digital cameral 1, a finder eyepiece lens 121a, and an image display section 131 for displaying recorded images and various information are arranged.

Figure 2:
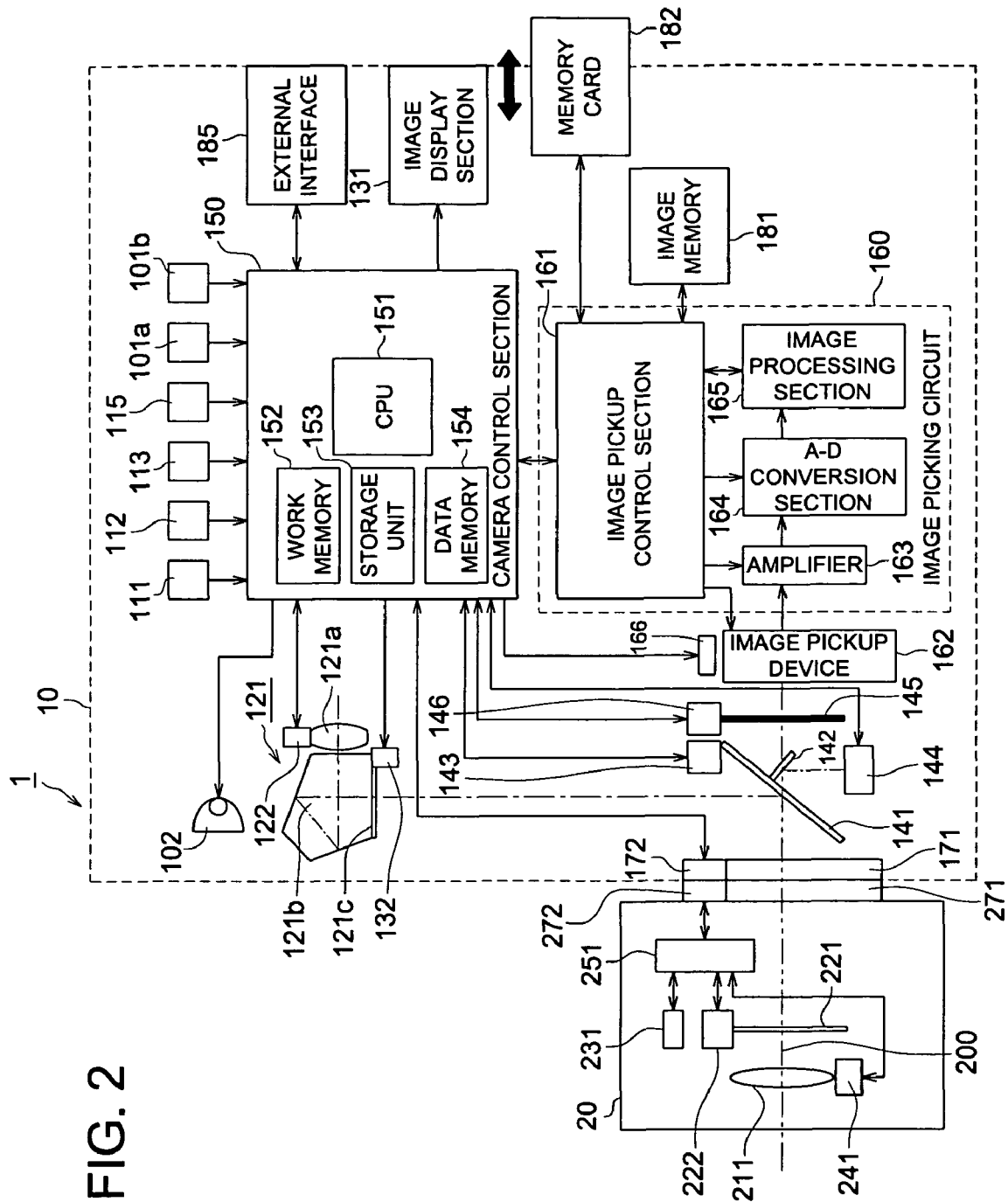
FIG. 2 is a block diagram showing an example of the circuit of the digital camera shown in FIG. 1.

FIG. 2 is a block diagram showing an example of the circuit of the digital camera 1 shown in FIGS. 1(a) and 1(b). In the drawing, to the same parts as those shown in FIGS. 1(a) and 1(b), the same numbers are assigned.

A camera control section 150 for controlling the digital camera 1 is structured by a central processing unit (CPU) 151, a work memory 152, and a storage unit 153, reads the program stored in the storage unit 153 into the work memory 152, and centrally controls the units of the digital camera 1 according to the concerned program.

Further, the camera control section 150 receives input signals from the power source switch 111, mode setting dial 112, change dial 113, jog dial 115, AF switch 101a, and release switch 101b, controls the photometry operation by communicating with a photometry module 122 on an optical finder 121, controls the AF operation by communicating with an AF module 144, drives a reflex mirror 141 and a sub-mirror 142 via a mirror driving section 143, controls a shutter 145 via a shutter driving section 146, controls the flash 102, controls the imaging operation by communicating with an image pickup control section 161, displays imaged data and various information on the image display section 131, and displays various information on an infinder display section 132. Further, the camera control section 150 sends or receives imaged data and a control signal from the digital camera 1 to or from a personal computer installed outside the digital camera 1 and a portable information terminal via an external interface (I/F) 185.

Furthermore, the camera control section 150, through a BL communication section (on the body side) 172 installed on a mount (on the body side) 171 and a BL communication section (on the lens side) 272 installed on a mount (on the lens side) 271 which execute communication between the body 10 and the interchangeable lens 20 and via a lens interface 251 of the interchangeable lens 20, communicates with a lens control section 241 for controlling the focus and zoom of a lens 211, a stop control section 222 for controlling a stop 221, and a lens information storage section 231 for storing specific information of the interchangeable lens 20, thereby controls overall the interchangeable lens 20.

An image formed by the lens 211 of the interchangeable lens 20 is photoelectrically converted by an image pickup device 162, then is amplified by an amplifier 163, is converted to digital data by an analog-digital (A-D) conversion section 164, is converted to digital imaged data subject to a specified image process by an image processing section 165, is recorded once in an image memory 181, and finally is recorded in a memory card 182. These operations are controlled by the image pickup control section 161 under the control of the camera control section 150. The image pickup control section 161, amplifier 163, A-D conversion section 164, and image processing section 165 compose an image pickup circuit 160.

In the neighborhood of the image pickup device 162, a temperature sensor 166 is arranged and by the temperature sensor 166 and camera control section 150, the temperature of the image pickup device 162 or the internal temperature of the digital camera 1 is detected. The temperature sensor 166 and camera control section 150 function as a temperature detection section of the present invention.

Next, the first embodiment of the image pickup device of the present invention, drive system thereof, and a problem of the present invention will be explained by referring to FIGS. 3 to 5(b).

Figure 3:
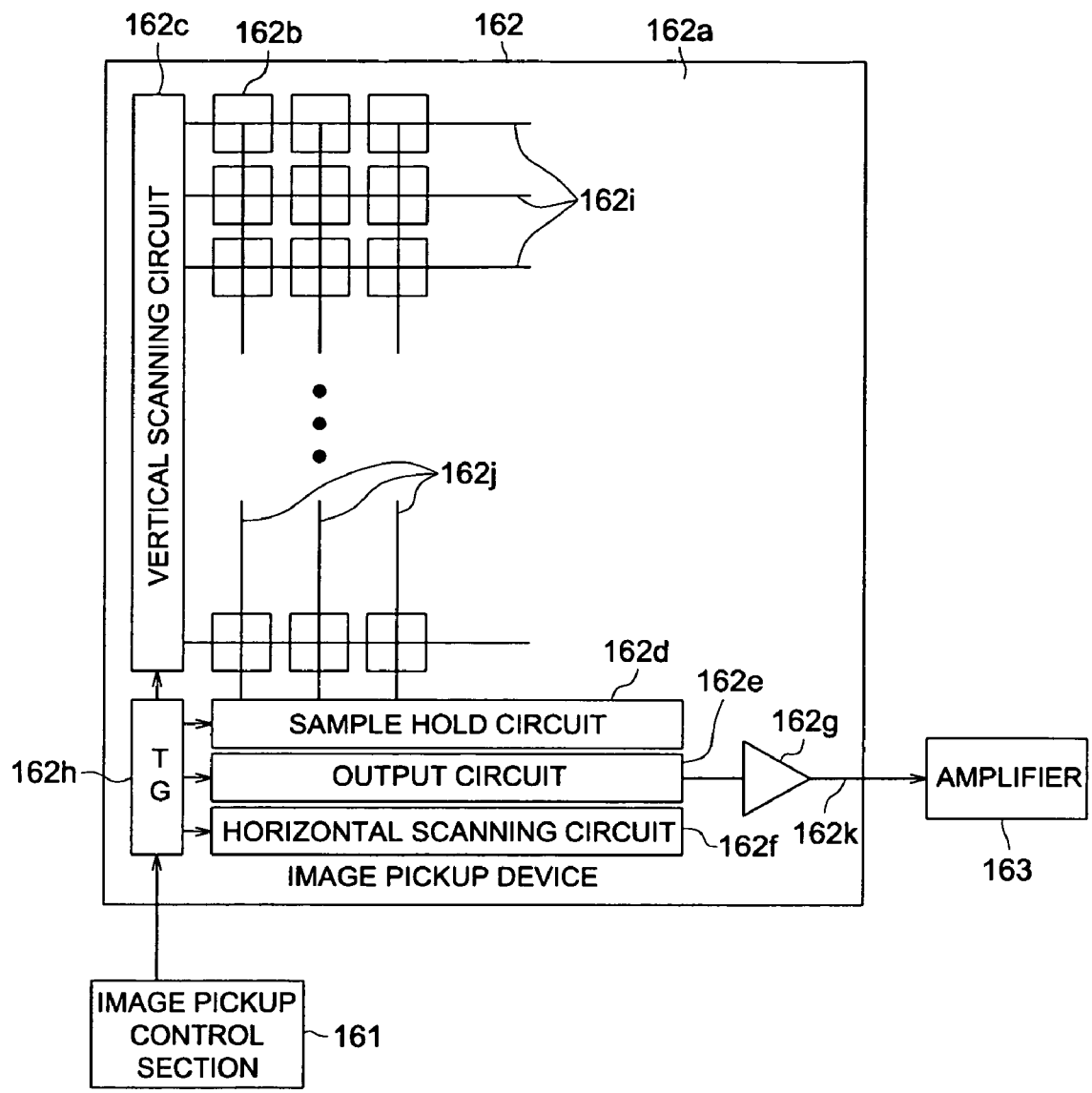
FIG. 3 is a schematic view showing an example of arrangement of the components composing an image pickup device.

FIG. 3 is a schematic view showing an example of arrangement of the components composing the image pickup device 162.

The image pickup device 162, on an image pickup surface 162a, includes components such as a plurality of pixels 162b arranged horizontally and vertically, a vertical scanning circuit 162c, a sample hold circuit 162d, an output circuit 162e, an output amplifier 162g, a horizontal scanning circuit 162f, and a timing generator (TG) 162h, and the rows of the pixels 162b in the horizontal direction and the vertical scanning circuit 162c are connected by row selection lines 162i, and the rows of the pixels 162b in the vertical direction and the sample hold circuit 162d are connected by vertical signal lines 162j.

Here, the sample hold circuit 162d has two capacitors not drawn for each vertical signal line 162j, and in the drive system of the image pickup device 162 shown in FIGS. 5(a) and 5(b) which will be described later, holds the pixel noise component in one capacitor, holds the pixel (signal+noise) component in the other capacitor, performs the so-called CDS (correlative double sampling) operation for obtaining the difference between them, thereby removes noise.

The imaging operation of the image pickup device 162, under the control by the image pickup control section 161, is controlled by the timing generator 162h and imaged data 162k which is output of the image pickup device 162 is input to the amplifier 163.

Figure 4:
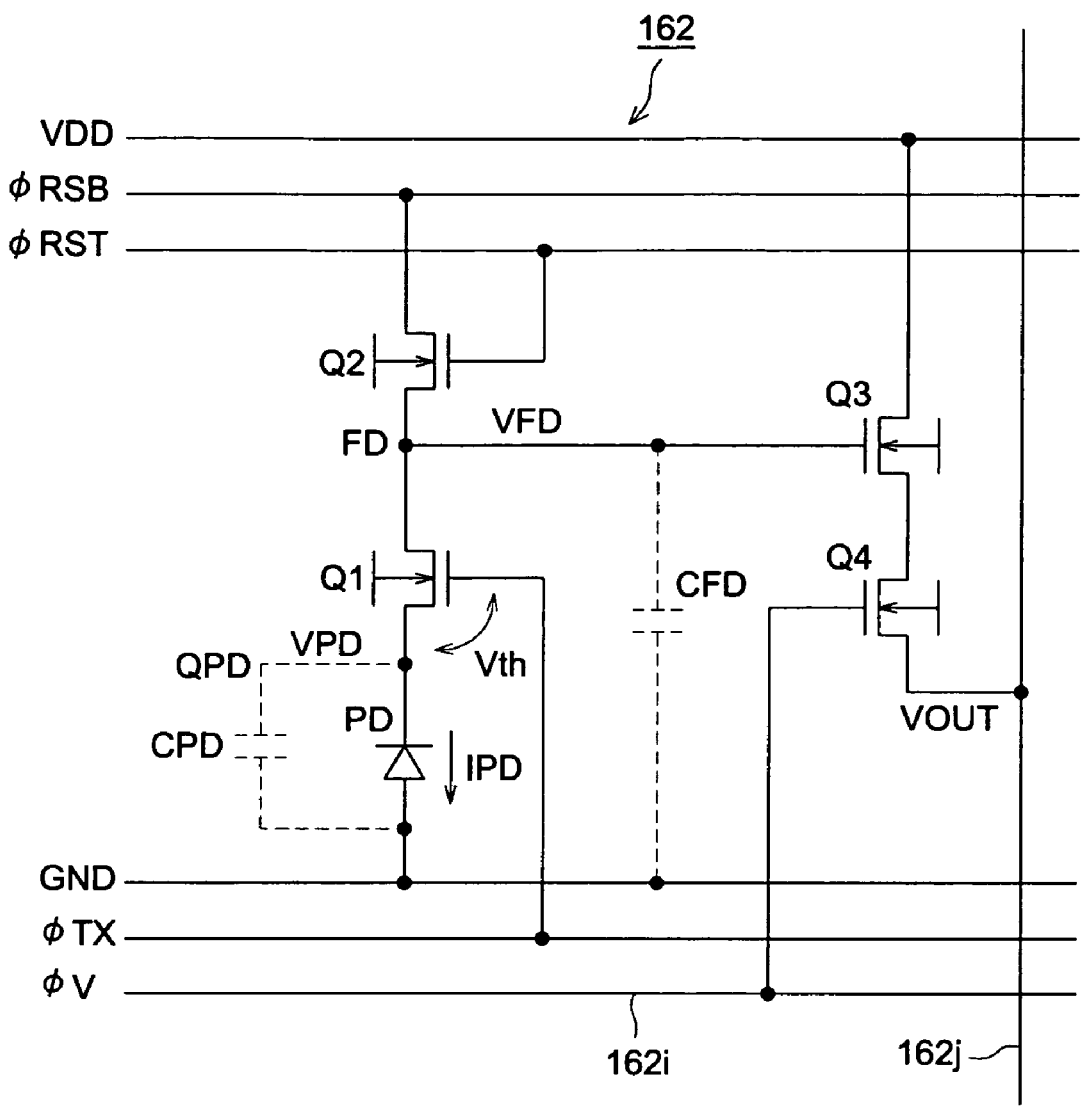
FIG. 4 is a circuit diagram showing an example of the circuit of the pixels composing the image pickup device.

FIG. 4 is a circuit diagram showing an example of the circuit of the pixels 162b composing the image pickup device 162.

The pixels 162b are structured by an embedded photodiode PD (hereinafter, referred to as PD section) and N channel MOS-FETs (metallic oxide film semiconductor field effect transistor, hereinafter referred to as a transistor) Q1 to Q4. The connecting portion of the drain electrode of the transistor Q1 and the source electrode of the transistor Q2 are structured by a floating diffusion FD (hereinafter, referred to as FD section). φRSB, φRST, φTX, and φV indicate signals (potential) for the respective transistors, and VDD indicates a power source, and GND indicates grounding.

The PD section is a photoelectric conversion section, which generates an optical current IPD according to the incident light quantity from a subject and the optical current IPD is stored in a parasitic capacity CPD of the PD section as a signal charge QPD. Actually, the PD section is reset to a high electrical potential (φRSB) in the early stage of imaging and performs an operation of discharging the charge QPD stored in the parasitic capacity CPD of the PD section by resetting by the optical current IPD. The PD section has a buried structure and cannot take out directly the optical current IPD converted photoelectrically, so that it is connected to the FD section via the transistor Q1 (hereinafter, referred to as the transfer gate Q1) called a transfer gate.

Figure 5A:
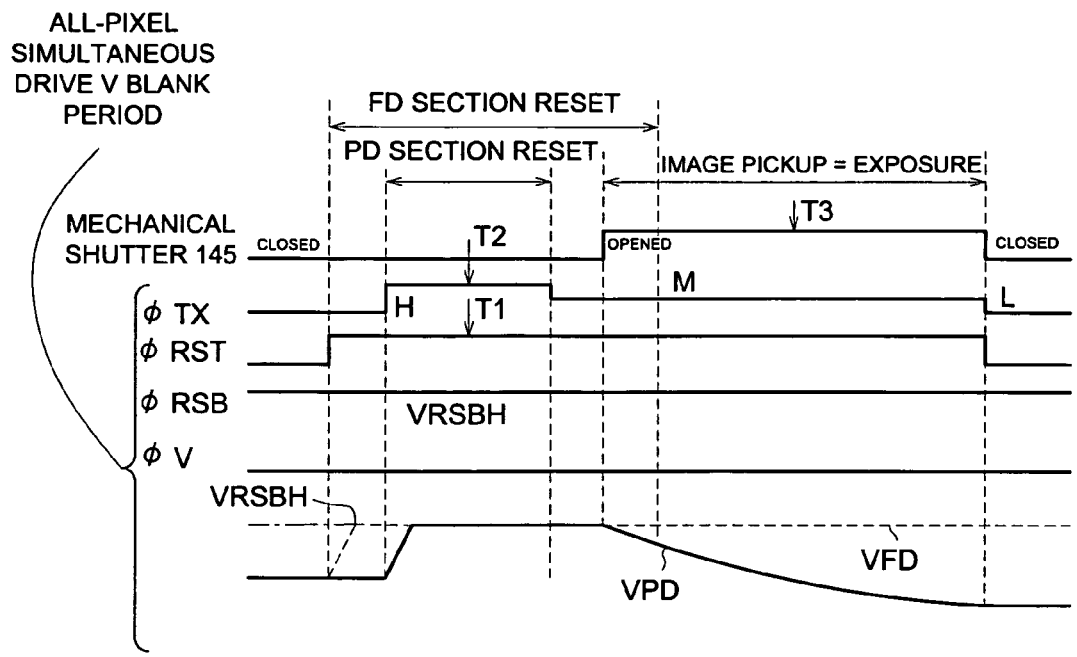
FIGS. 5(a) and 5(b) are timing charts showing the operation of the global reset method which is one of the driving methods of the image pickup device.

When the gate potential φTX of the transfer gate Q1, as shown in FIG. 5(a), is set at an intermediate potential M, assuming the threshold potential of the transfer gate Q1 as Vth, until the potential VPD of the PD section reaches M-Vth, the charge QPD of the parasitic capacity CPD of the PD section is discharged in the linear characteristic state (linear photoelectric conversion characteristic), and when the potential VPD of the PD section becomes lower than or equal to M-Vth, due to the sub-threshold characteristic of the transfer gate Q1, it is discharged in the logarithmic characteristic state (logarithmic photoelectric conversion characteristic) so as to set the potential VPD of the PD section to the potential when the optical current IPD is compressed logarithmically. Therefore, when the optical current IPD is small, that is, the subject is dark, the linear photoelectric conversion characteristic is obtained and when the optical current IPD is large, that is, the subject is bright, the logarithmic photoelectric conversion characteristic is obtained.

The threshold potential Vth of the transfer gate Q1 varies with each pixel. Namely, even if the gate potential φTX of the transfer gate Q1 of each pixel is set uniformly at the intermediate potential M, the point where the photoelectric conversion characteristic of the PD section is switched from the linear characteristic to the logarithmic characteristic, that is, the inflection point varies with variations in the threshold potential Vth for each pixel, thus variations of the inflection point which are a problem of the present invention occur.

The transistor Q2 is called a reset gate (hereinafter, referred to as reset gate Q2) and when it is turned on, it resets the FD section to a predetermined potential (φRSB). During the reset operation of the reset gate Q2, when the transfer gate Q1 is turned on simultaneously, the PD section can be reset simultaneously to the predetermined potential (φRSB).

The transistor Q3 composes a source follower amplifier circuit and when the current is amplified for the potential VFD of the FD section, it functions so as to lower the output impedance.

The transistor Q4 is a transistor for reading a signal, and the gate is connected to the row selection line 162i aforementioned and operates as a switch which is turned on or off according to the signal φV applied by the vertical scanning circuit 162c. The source electrode of the transistor Q4 is connected to the vertical signal line 162j, and when the transistor Q4 is turned on, the potential VFD of the FD section is changed to low impedance by the transistor Q3 and is led to the vertical signal line 162j as pixel output VOUT.

Figure 5B:
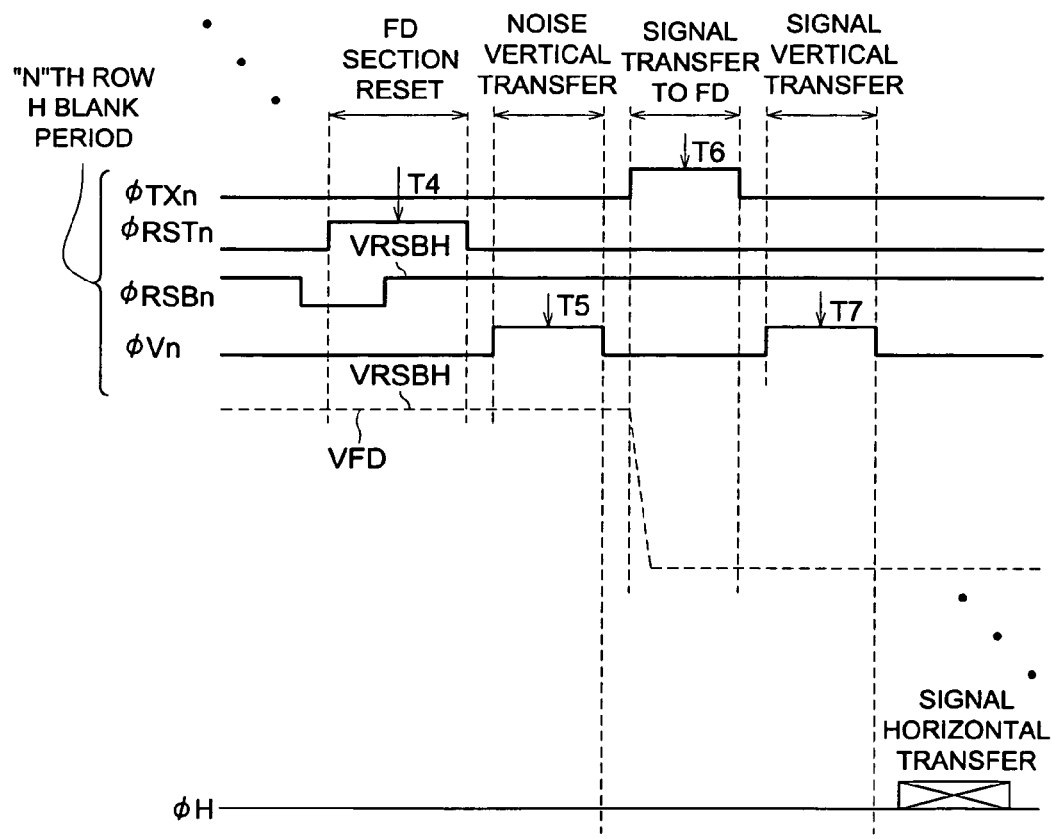

FIGS. 5(a) and 5(b) are timing charts showing the operation of the global reset method which is one of the driving methods of the image pickup device, and FIG. 5(a) is a timing chart of the imaging operation which is performed simultaneously for all the pixels, and FIG. 5(b) is a timing chart of the operations of vertical transfer and horizontal transfer of the imaged data and noise data which are sequentially executed for each horizontal row. In the global reset method, the exposure amount control of the image pickup device is executed by the stop 221 and shutter 145.

In FIG. 5(a), during the V blank period, in the state that the shutter 145 is closed, φRSB is set at the predetermined potential (VRSBH), and φRST is set to a high potential at the timing T1, thus the reset gate Q2 is turned on, and the potential VFD of the FD section is reset (initialized) to VRSBH. φTX is set to the high potential at the timing T2 included in the timing T1, so that the transfer gate Q1 is turned on and the parasitic capacity CPD of the PD section is reset to VRSBH. By doing this, both the PD section and FD section are reset. At the end of the timing T2, φTX is set to the intermediate potential M, so that the PD section enters the state that imaging in the linear log characteristic is available.

The shutter 145 is opened at the beginning of the timing T3, and the light from the subject is photoelectrically converted by the PD section, and the charge QPD of the parasitic capacity CPD starts discharging, and the operation is continued until the shutter 145 is closed at the end of the timing T3. The aforementioned is the imaging operation simultaneously performed for all the pixels.

In FIG. 5(b), during the H blank period, φRST (φRSTn) on the "n"th row in the horizontal direction is set to a high potential at the timing T4, so that the reset gate Q2 of all the pixels 162b on the "n"th row in the horizontal direction is turned on, and φRST (φRSTn) on the "n"th row in the horizontal direction is set to the specified potential (VRSBH), thus the potential VFD of the FD section is reset again to VRSBH. At this time, at the potential VFD of the FD section, reset noise VFDnoise in correspondence with the reset operation may remain.

The potential φV (φVn) of the row selection line 162j on the "n"th row in the horizontal direction is set to a high potential at the timing T5, so that the transistor Q4 is turned on, and the potential VFD (here, reset noise VFDnoise) of the FD section is derived to the vertical signal line 162j as pixel output VOUT of the pixels 162b, and the pixel output VOUT of all the pixels on the "n"th row in the horizontal direction is held by one of the capacitors of the sample hold circuit 162d as reset noise data NOISEn on the "n"th row in the horizontal direction.

φTX (φTXn) on the "n"th row in the horizontal direction is set to a high potential at the timing T6, so that the transfer gate Q1 is turned on and the charge QPD of the parasitic capacity CPD of the PD section is transferred completely to the FD section. At this time, the reset noise VFDnoise is kept left in the FD section, so that the potential VFD of the FD section is the one when the reset noise VFDnoise is superposed on signal output VFDsignal by the signal charge QPD.

The potential φV (φVn) of the row selection line 162i on the "n"th row in the horizontal direction is set to a high potential at the timing T7 similarly to the timing T5, so that the transistor Q4 is turned on, and the potential VFD (here, VFDsignal+VFDnoise) of the FD section is derived to the vertical signal line 162j as pixel output VOUT of the pixels 162b, and the pixel output VOUT of all the pixels on the "n"th row in the horizontal direction is held by the other capacitor of the sample hold circuit 162d as a (SIGNALn +NOISEn) signal, and the difference from the reset noise data NOISEn aforementioned on the "n"th row in the horizontal direction is taken out (the so-called CDS: correlative double sampling), and an image signal component SIGNALn from which the noise component is removed is generated and according to the horizontal transfer signal φH, is output to the amplifier 163 as imaged data 162k (SIGNALn) via the output circuit 162e and output amplifier 162g.

As mentioned above, the global reset method, since the reset noise is removed completely, has a feature of acquisition of images of high-quality.

Figure 6A:
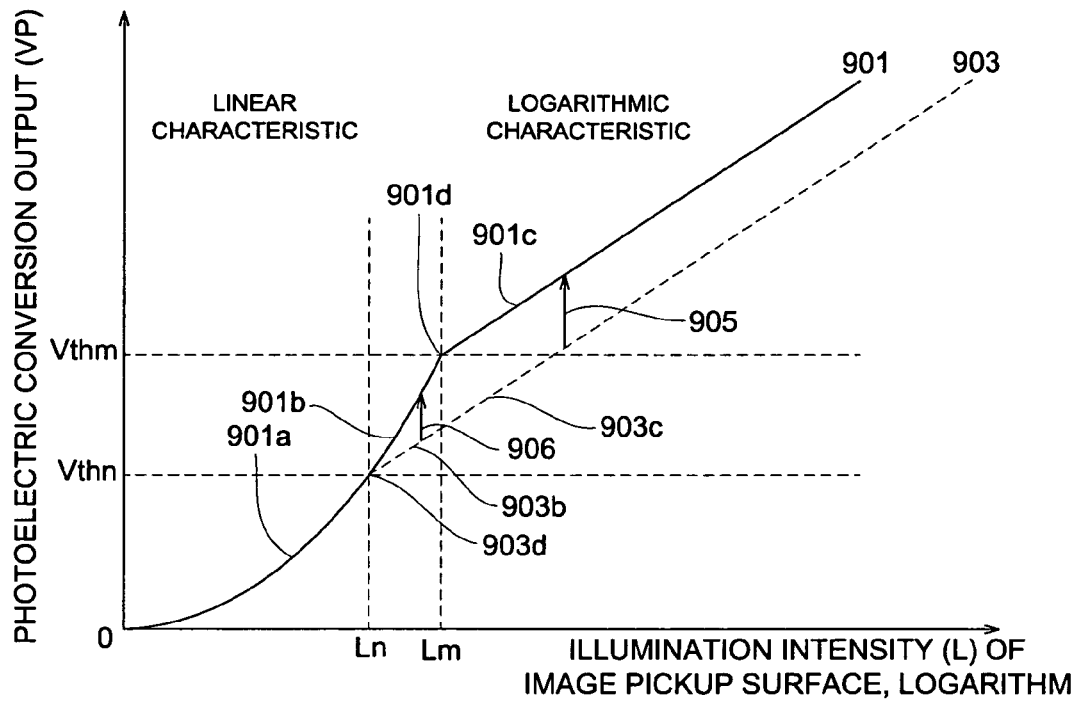
FIGS. 6(a) and 6(b) are drawings showing the inflection point variation correction method.
Figure 6B:
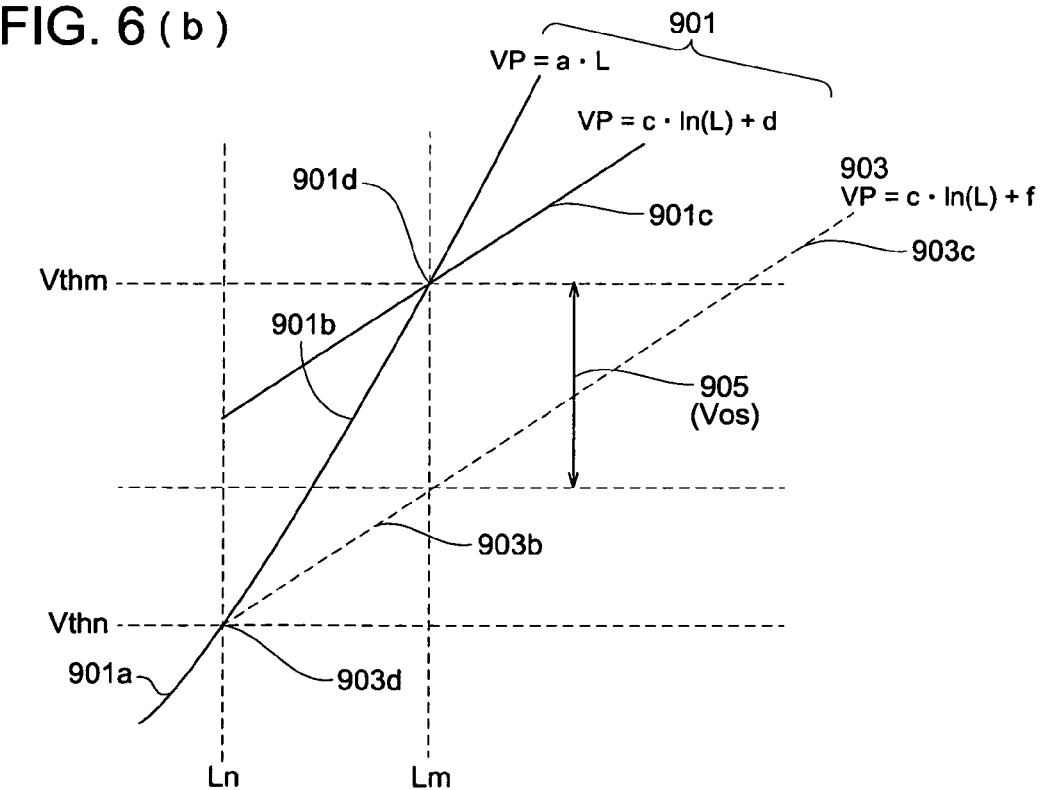
Figure 16:
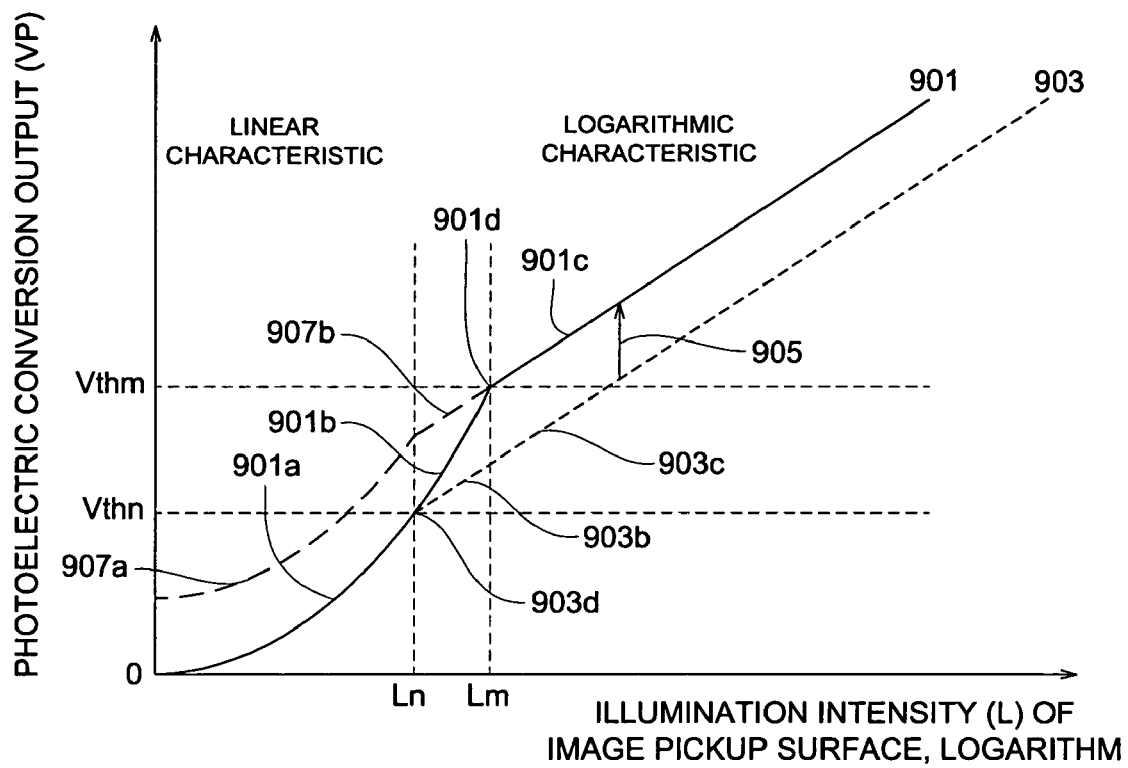
FIG. 16 is a schematic view showing the two photoelectric conversion characteristic graphs whose inflection points are shifted.

Next, the inflection point variation correction method of the present invention will be explained by referring to FIGS. 6(a) and 6(b). FIGS. 6(a) and 6(b) are drawings showing the inflection point variation correction method, and FIG. 6(a) is a schematic view of the photoelectric conversion characteristic showing the correction method, and FIG. 6(b) is an enlarged view of the vicinity of the inflection points 901d and 903d shown in FIG. 6(a) and a schematic view showing the calculation method for the inflection points. To the same parts as those shown in FIG. 16, the same numbers are assigned. Further, in FIGS. 6(a) and 6(b), for the comparison with FIG. 16 shown in a problem of the present invention, when the illumination intensity L of the image pickup surface is increased, the photoelectric conversion output VP is indicated so as to increase, though in the examples shown in FIGS. 4, 5(a), and 5(b), when the illumination intensity L of the image pickup surface is increased, the photoelectric conversion output VP is reduced. In this case, it is desirable to turn the axis of ordinate shown in FIGS. 6(a). and 6(b) upside down.

Firstly, in FIG. 6(a), when considering the photoelectric conversion characteristic 903 in which the inflection point 903d is shifted from the standard characteristic 901, within the linear characteristic part 901a of the standard characteristic 901, the part in which the illumination intensity L of the image pickup surface is darker than that at the inflection point 903d, since the standard characteristic 901 and photoelectric conversion characteristic 903 are the same characteristic, will not be corrected. With respect to the logarithmic characteristic part 901c of the standard characteristic 901 and within the logarithmic characteristic part of the photoelectric conversion characteristic 903, the part in which the illumination intensity of the image pickup surface is larger than Lm, similarly to the explanation in FIG. 16, the photoelectric conversion characteristic 903 executes a parallel movement (hereinafter, referred to as offset) 905 in the direction of the ordinate axis shown in the drawing, thus the part in which the illumination intensity of the image pickup surface of the logarithmic characteristic 903c is larger than Lm is made fit to the characteristic 901c, which means the error between the two characteristics is corrected.

With respect to the parts (the parts in which the illumination intensity of the image pickup surface is between Lm and Ln) in which the photoelectric conversion characteristic 901 is a linear characteristic and the photoelectric conversion characteristic 903 is a logarithmic characteristic, a characteristic transformation 906 from logarithm to linearity is executed for the characteristic 903b, thus the characteristic 903b is made fit to the characteristic 901b. The inflection point 901d of the standard characteristic 901 is given from a measured value of the standard characteristic 901 as a standard inflection point, so that if the inflection point 903d of the photoelectric conversion characteristic 903 is found, the characteristic 903b can be transformed to the characteristic 901b. Thus, the error between two characteristics can be corrected.

The standard characteristic 901 may be the photoelectric conversion characteristic of a specific pixel (for example, the pixel at the center of the screen), the mean value, maximum value, or minimum value of all the pixels of the image pickup device 162, or a photoelectric conversion characteristic of a virtual pixel. In this embodiment, to simplify the offset calculation which will be described later in FIGS. 8(a) and 8(b), the photoelectric conversion characteristic of the pixel having the greatest inflection point among all the pixels is decided as the standard characteristic 901.

Next, the calculation method for the inflection point 903d of the photoelectric conversion characteristic 903 will be explained by referring to FIG. 6(b).

In the standard characteristic 901, the linear characteristic area and logarithmic characteristic area are expressed by:

$$VP = a \cdot L \quad \text{Formula 1}$$

$$VP = c \cdot \ln(L) + d \quad \text{Formula 2}$$

where a, c, and d are constants given from measured values of the standard characteristic 901. Further, the logarithmic characteristic area of the photoelectric conversion characteristic 903 can be expressed by $VP = c \cdot \ln(L) + f$. Here, the relationship between the photoelectric conversion output Vthn of the inflection point 903d of the photoelectric conversion characteristic 903 and the size of the offset 905 (hereinafter, referred to as the offset value Vos) will be derived.

Firstly, the photoelectric conversion output Vthm of the inflection point 901d, photoelectric conversion output Vthn of the inflection point 903d, and offset value Vos are expressed by:

$$Vthm = c \cdot \ln(Lm) + d = a \cdot Lm \quad \text{Formula 3}$$

$$Vthn = c \cdot \ln(Ln) + f = a \cdot Ln \quad \text{Formula 4}$$

$$Vos = Vthm - (c \cdot \ln(Lm) + f) = d - f \quad \text{Formula 5}$$

and from Formula 4, the following formula is obtained.

$$c \cdot \ln(Ln) + d - Vos = a \cdot Ln \quad \text{Formula 6}$$

where a, c, and d are constants. When the offset value Vos is given to Formula 6 and Ln satisfying it is obtained, the relationship between the offset value Vos and the photoelectric conversion output Vthn of the inflection point 903d can be decided uniquely. Namely, if the offset value Vos is found, the photoelectric conversion output Vthn of the inflection point 903d is found uniquely. And, if the photoelectric conversion output Vthn of the inflection point 903d is found, the photoelectric conversion characteristic 903d of the logarithmic characteristic can be transformed to the photoelectric conversion characteristic 901b of the linear characteristic.

Generally, the offset value Vos derived from Formula 6 and the photoelectric conversion output Vthn are stored in a form of a look-up table (hereinafter, referred to as LUT), and the offset value Vos is given to the LUT to obtain the photoelectric conversion output Vthn, thus the calculation time can be shortened and the storage capacity can be reduced. An image of the LUT is shown in FIG. 15(a) as an inflection point converter 803 which will be described later in FIGS. 8(a) and 8(b).

Figure 7:
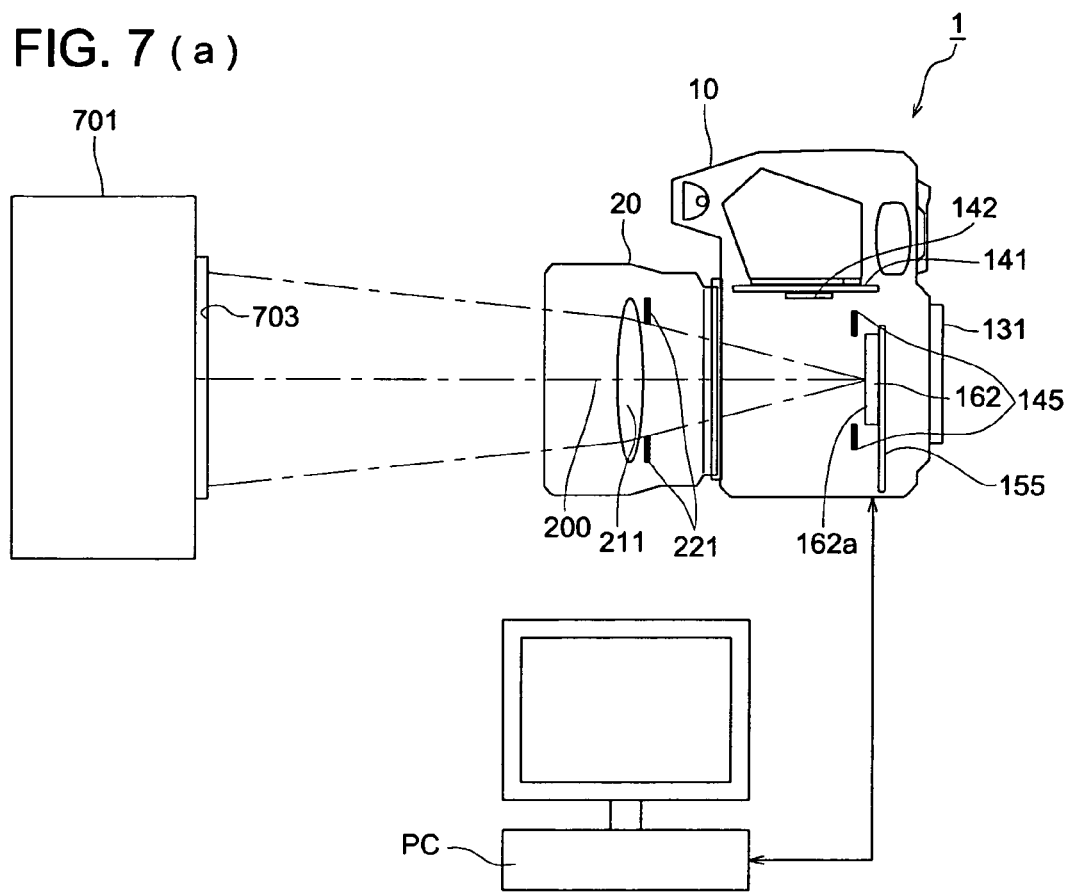
FIGS. 7(a) and 7(b) are drawings for explaining the obtaining method of offset values.
Figure 7:
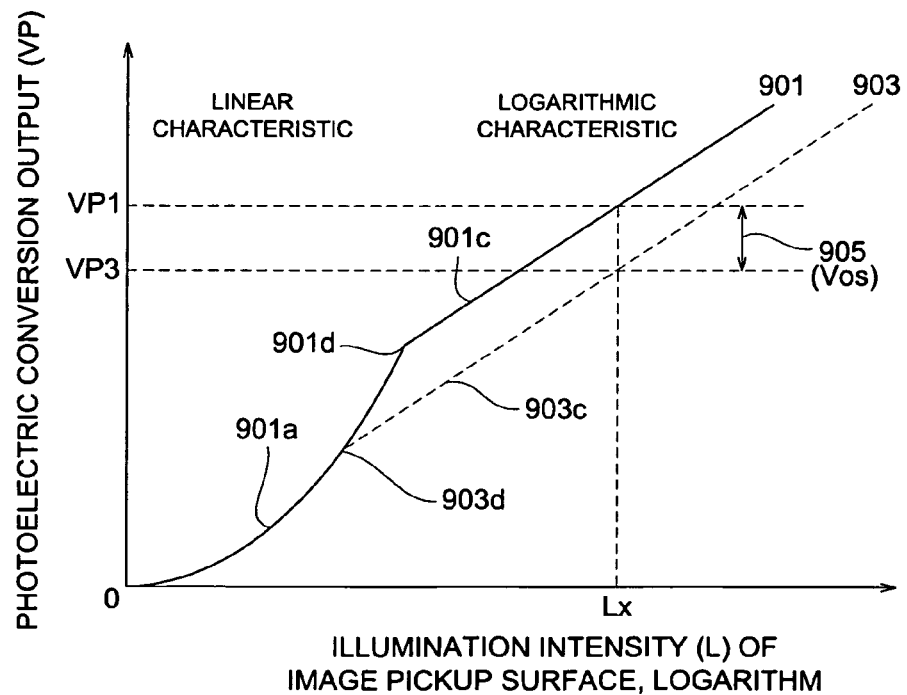

Next, an example of the obtaining method of the offset value Vos will be explained by referring to FIGS. 7(a) and 7(b). FIG. 7 shows drawings for explaining an example of the obtaining method of the offset value Vos, and FIG. 7(a) is a schematic view showing the offset adjustment method, and FIG. 7(b) is a schematic view of the photoelectric conversion characteristic showing the obtaining method of the offset value Vos. To the same parts as those shown in FIGS. 1(a), 1(b), 2, 6(a), and 6(b), the same numbers are assigned.

In FIG. 7(a), for example, at time of factory shipment of the digital camera 1, for the image pickup operation, the reflex mirror 141 and sub-mirror 142 are mirror-upped, and the shutter 145 is kept open, and a light source box 701 is used, and to enter uniform light to the image pickup surface 162a of the image pickup device 162 installed on an image pickup device substrate 155, the light source box 701 and a light source surface 703 are set, and so as to make the illumination intensity on the image pickup surface 162a of the image pickup device 162 to be the illumination intensity Lx of the image pickup surface for switching the photoelectric conversion characteristic of all the pixels to the logarithmic characteristic, the brightness of the light source surface 703 is set.

When reading the photoelectric conversion output VP of a pixel at the image pickup time aforementioned as imaged data (for example, VP3 shown in FIG. 7(b)) and comparing it with VP of the standard characteristic (for example, VP1 shown in FIG. 7(b)), the offset value Vos (=VP1−VP3) of the offset 905 can be obtained. When this operation is performed for all the pixels, the offset value Vos of all the pixels can be known and from the offset value Vos of a pixel, by Formula 6 aforementioned, the photoelectric conversion output Vthn of the inflection point of a pixel can be calculated or can be referred to the LUT.

A series of the operations, by the camera control section 150 and image pickup circuit 160, or when necessary, is calculated and controlled by a personal computer PC outside the digital camera 1. The camera control section 150, image pickup circuit 160, and personal computer PC function as a correction data generation section of the present invention.

Next, a correction section for realizing the inflection point variation correction method shown in FIGS. 6(a) and 6(b) will be explained by referring to FIGS. 8(a) and 8(b). FIGS. 8(a) and 8(b) are drawings showing an example of the inflection point variation correction section, and FIG. 8(a) is a circuit block diagram showing an example of the inflection point variation correction section, and FIG. 8(b) is a flow chart showing the operation of a comparator 805.

An inflection point variation correction section 800, for example, is installed inside the image processing section 165 and is structured by an offset value memory 801, an inflection point converter 803, the comparator 805, an adder 807, a characteristic converter 809, and a selector 811. Further, the existence of the inflection point variation means the existence of a variation of the photoelectric conversion characteristic, thus, the inflation point variation correction section may be called a characteristic variation correction section.

Figure 15:
FIGS. 15(a) and 15(b) are schematic views showing an image of the LUT.
Figure 15:

The offset value memory 801 functions as a correction data storing section of the present invention, stores the offset value Vos of all the pixels of the image pickup device 162 obtained by the methods shown in FIGS. 7($a$) and 7($b$), and outputs an offset value 813 to the inflection point converter 803 and adder 807, which functions as an error correction section of the present invention. The inflection point converter 803 is structured by the LUT explained in FIGS. 6($a$) and 6($b$), stores the table of the offset value Vos derived from Formula 6 and inflection point output Vthn, and on the basis of the offset value 813 output from the offset value memory 801, outputs inflection point output 815 to the comparator 805. An image of the inflection point converter 803 is shown in FIG. 15($a$).

The comparator 805 compares imaged data 817 of a pixel of the image pickup device 162 with the inflection point output 815 of a pixel outputted from the inflection point converter 803 and outputs comparison output 819 to the selector 811. The comparison output 819 conforms to any of the three cases indicated below. Case (1): The imaged data 817 of a pixel is larger than or equal to the difference Vthm–Vos between the inflection point output Vthm of the standard characteristic and the offset value Vos. Case (2): The imaged data 817 of a pixel is smaller than the difference Vthm–Vos between the inflection point output Vthm of the standard characteristic and the offset value Vos and is larger than or equal to the inflection point output Vthn of a pixel. Case (3): The imaged data 817 of a pixel is smaller than or equal to the inflection point output Vthn of a pixel.

The operation of the comparator aforementioned will be explained by referring to the flow chart shown in FIG. 8($b$). At Step S11, the comparator confirms whether the imaged data 817 is larger than or equal to the difference Vthm–Vos between the inflection point output Vthm of the standard characteristic and the offset value Vos or not. When it is larger or equal (YES at Step S11), at Step S12, the comparator outputs a signal indicating Case (1) to the comparison output 819 and finishes the comparison operation. When the imaged data 817 is smaller than the difference Vthm–Vos between the inflection point output Vthm of the standard characteristic and the offset value Vos (NO at Step S11), at Step S21, the comparator confirms whether the imaged data 817 is smaller than or equal to the inflection point output Vthn of a pixel or not. When it is smaller or equal (YES at Step S21), at Step S31, the comparator outputs a signal indicating Case (3) to the comparison output 819 and finishes the comparison operation. When the imaged data 817 is larger than the inflection point output Vthn of a pixel (NO at Step S21), at Step S22, the comparator outputs the signal indicating Case (2) to the comparison output 819 and finishes the comparison operation.

The adder 807 adds the offset value 813 of a pixel outputted from the offset value memory 801 to the imaged data 817 of a pixel and outputs offset correction output 821 to the selector 811. The characteristic converter 809 functioning as a characteristic transformation section of the present invention is structured by an LUT and as shown in FIG. 6($b$), has a table for converting the logarithmic characteristic 903$b$ to the linear characteristic 901$b$, performs characteristic transformation for the imaged data 817 of a pixel, and outputs characteristic transformation output 823 to the selector 811. An image of the characteristic converter 809 is shown in FIG. 15($b$). Furthermore, the imaged data 817 of a pixel is input also to the selector 811.

To the selector 811, three signals of the offset correction output 821, characteristic transformation output 823, and imaged data 817 are input and according to the three cases aforementioned of the comparison output 819 of the comparator 805, when the comparison output 819 conforms to Case (1), the offset correction output 821, when the comparison output 819 conforms to Case (2), the characteristic transformation output 823, and when the comparison output 819 conforms to Case (3), the imaged data 817 are selected straight and are outputted as an inflection point variation correction output 825. The inflection point converter 803, comparator 805, and selector 811 function as a correction manner decision section of the present invention.

By the inflection point variation correction section 800 aforementioned, as explained in FIG. 6($a$), the photoelectric conversion characteristic of a pixel is divided into three areas in relation to the standard characteristic and variations of the inflection point can be corrected in each area by an optimum method.

In this embodiment, the photoelectric conversion characteristic of the pixel having a greatest inflection point among all the pixels is set as a standard characteristic, though for example, when the photoelectric conversion characteristic of the pixel having a smallest inflection point is set as a standard characteristic, the offset values Vos stored in the offset value memory 801 all become negative values, and the characteristic converter 809 becomes an LUT for converting the linear characteristic to a logarithmic characteristic, and the magnitude relations of the comparison output 819 of the comparator 805 are all reversed. Further, for example, when the mean value of the inflection points of all the pixels is set as a standard characteristic, the offset values Vos stored in the offset value memory 801 become positive or negative values, and the characteristic converter 809 becomes an LUT for converting the linear characteristic to a logarithmic characteristic or the logarithmic characteristic to a linear characteristic, and the comparison output 819 of the comparator 805 is divided into the two cases aforementioned due to the magnitude relations between the inflection point of the standard characteristic and the inflection point of a pixel, though the basic conception is exactly the same as that of this embodiment.

Figure 8:
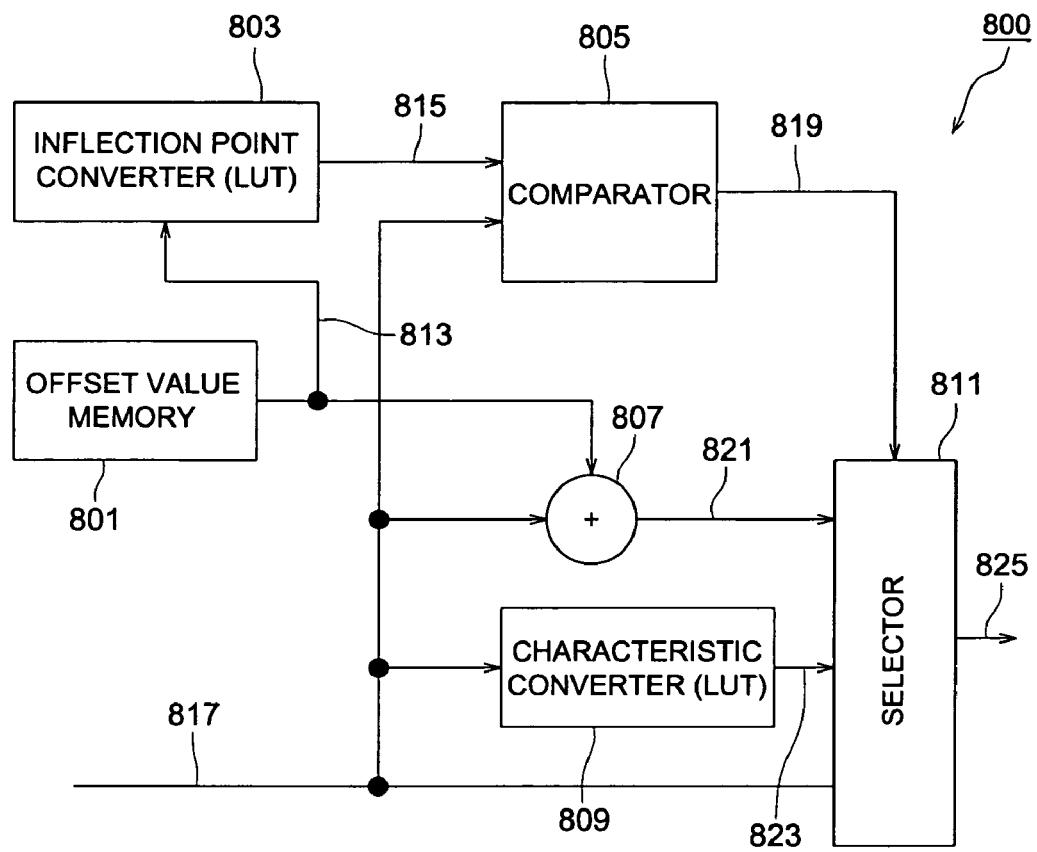
FIGS. 8(a) and 8(b) are a circuit block diagram and a flow chart showing an example of the inflection point variation correction section.
Figure 8:
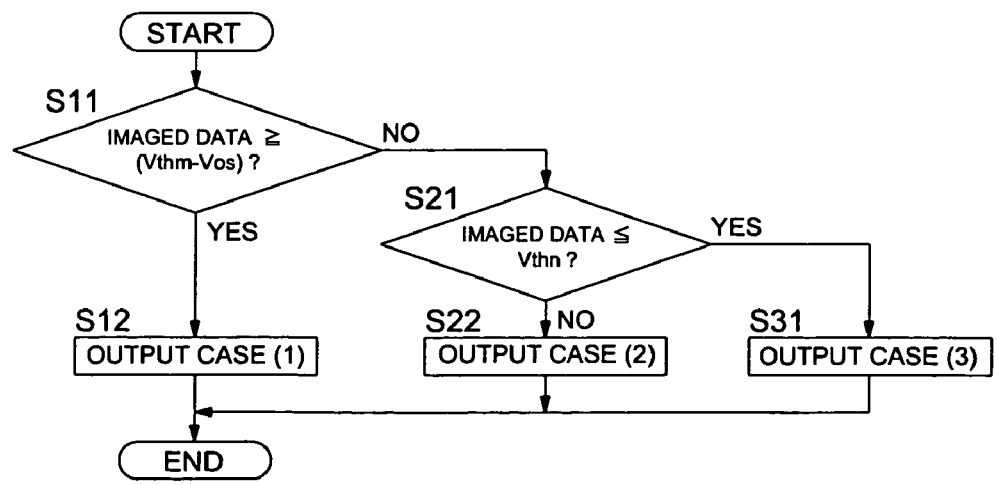
Figure 17:
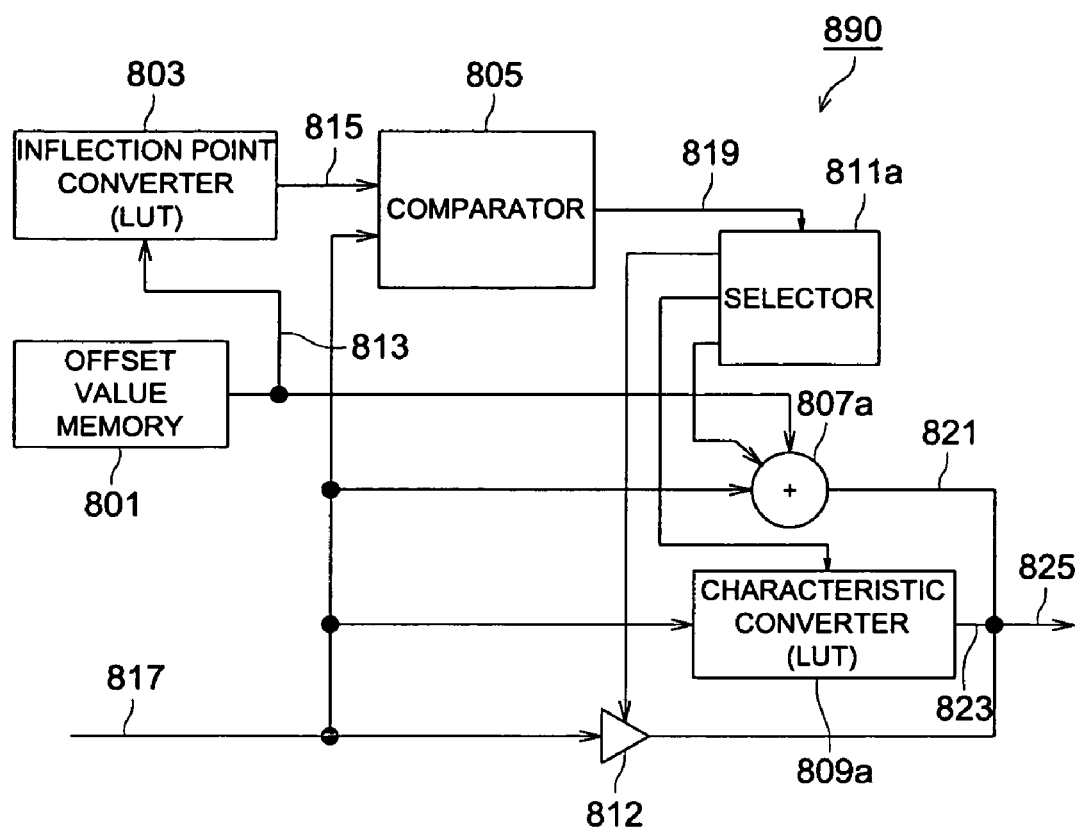
FIG. 17 is a circuit block diagram showing another example of the inflection point variation correction section.

FIG. 17 shows an inflection variation correction section 890 which is another aspect of the inflection variation correction section 800 described with FIG. 8($a$). In FIG. 17, elements having the same functions as in FIG. 8($a$) are assigned the same numbers, and the explanations are omitted. An adder 807$a$ and a characteristic converter 809$a$ have the same function as the adder 807 and the characteristic converter 809 respectively, but have an enable terminal which instructs allowance or prohibition of their operation. A buffer 812 is a buffer with an enable terminal. A selector 811$a$ outputs an enable signal in response to the comparison output 819 as an input signal, and the operation of adder 807$a$, the operation of the characteristic converter 809$a$ and the operation of buffer 812 are selected in the case of case (1), case (2) and case (3) respectively in response to three cases of the comparison output 819 of the comparator 805, and the inflection point variation correction output 825 is outputted. The inflection point converter 803, comparator 805 and selector 811 function as a correction manner decision section of the present invention.

Next, another embodiment of the inflection point variation correction section will be explained by referring to FIGS. 9(a), 9(b), 10(a), 10(b), 11(a), and 11(b). FIGS. 9(a), 9(b), 10(a), 10(b), and 11(a) are circuit block diagrams showing other examples of the inflection point variation correction section and FIG. 11(b) is a schematic view of the photoelectric conversion characteristic for explaining FIG. 11(a). In the drawings, to the same parts shown in FIGS. 8(a), 8(b), 9(a), 9(b), 10(a), 10(b), 11(a), and 11(b), the same numbers are assigned.

Figure 9:
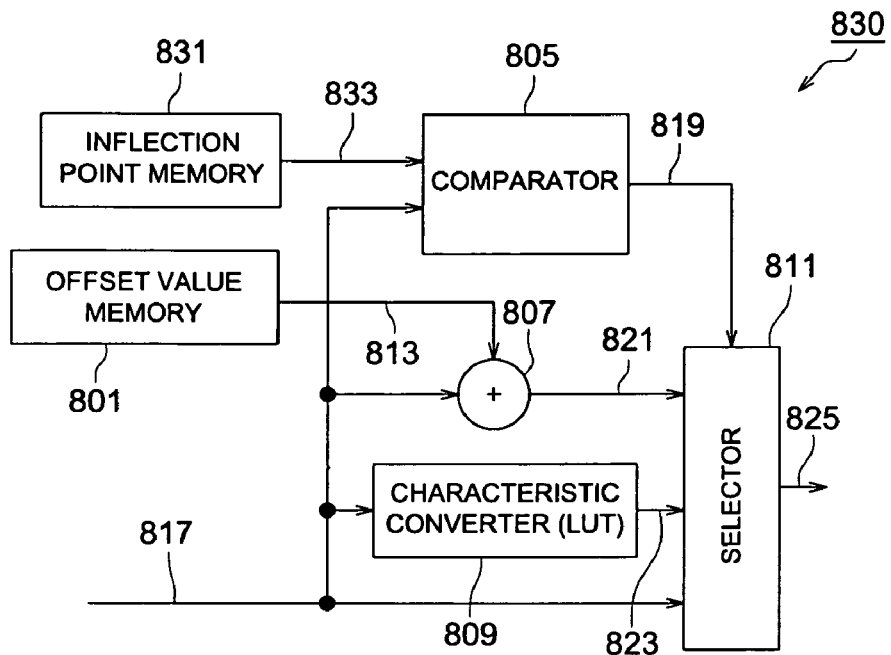
FIGS. 9(a) and 9(b) are circuit block diagrams showing another example of the inflection point variation correction section.
Figure 9:
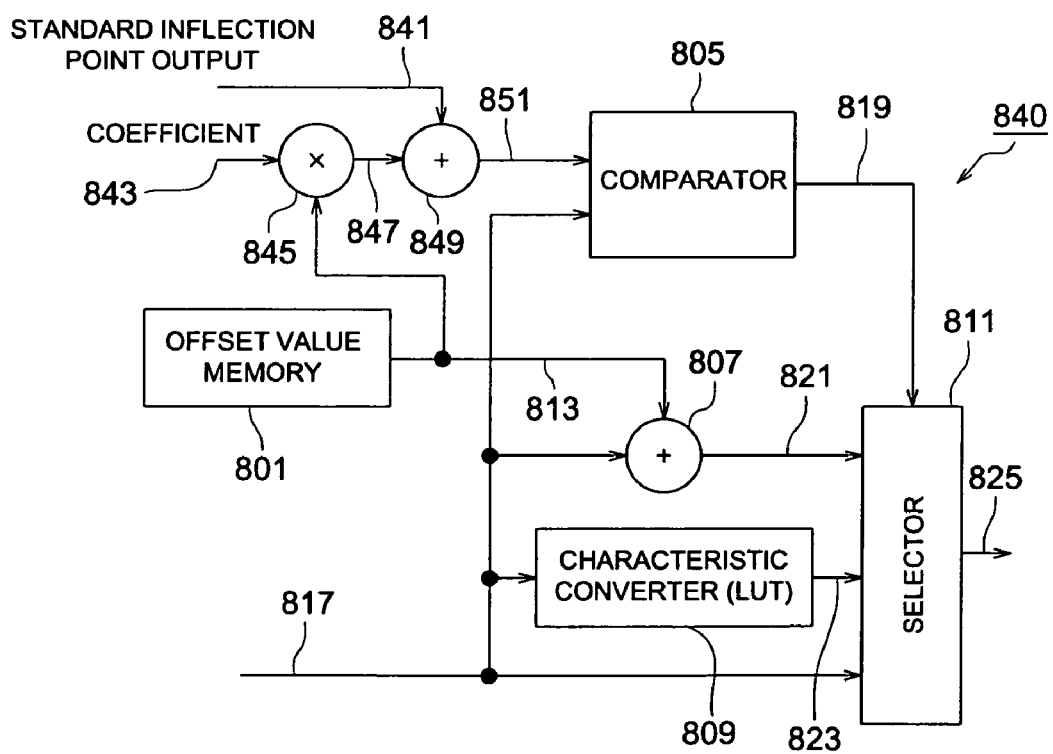

In an inflection point variation correction section 830 shown in FIG. 9(a), in place of the inflection point converter 803 shown in FIGS. 8(a) and 8(b), an inflection point memory 831 for storing the inflection point output of all the pixels is installed and inflection point output 833 of each pixel is outputted to the comparator 805. The others are the same as those shown in FIGS. 8(a) and 8(b). On the basis of the offset value 813 outputted from the offset value memory 801, there is no need to take out the inflection point output of each pixel from the inflection point converter 803, so that the inflection point variation correction section 830 is suitable for the high speed processing, though as compared with the inflection point converter 803 shown in FIGS. 8(a) and 8(b), the capacity of the inflection point memory 831 is increased.

In an inflection point variation correction section 840 shown in FIG. 9(b), in place of the inflection point converter 803 shown in FIGS. 8(a) and 8(b), a multiplier 845 and an adder 849 are installed, and the offset value 813 is multiplied by a coefficient 843, and the product thereof 847 is added to the inflection point output of the standard characteristic, thus the inflection point of a pixel is calculated approximately. The others are the same as those shown in FIGS. 8(a) and 8(b). The coefficient in this case is desirably a coefficient in accordance with each offset value, though it may be a mean value of the coefficients. The approximation accuracy varies with the coefficient, though there is an advantage that the inflection point converter 803 (LUT) is not required.

Figure 10:
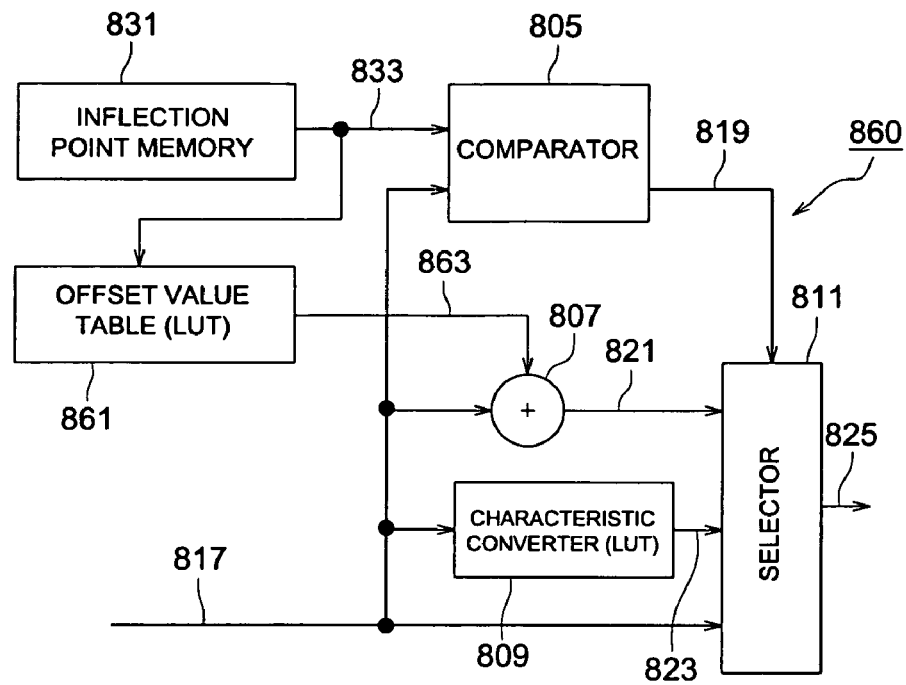
FIGS. 10(a) and 10(b) are circuit block diagrams showing still another example of the inflection point variation correction section.
Figure 10:
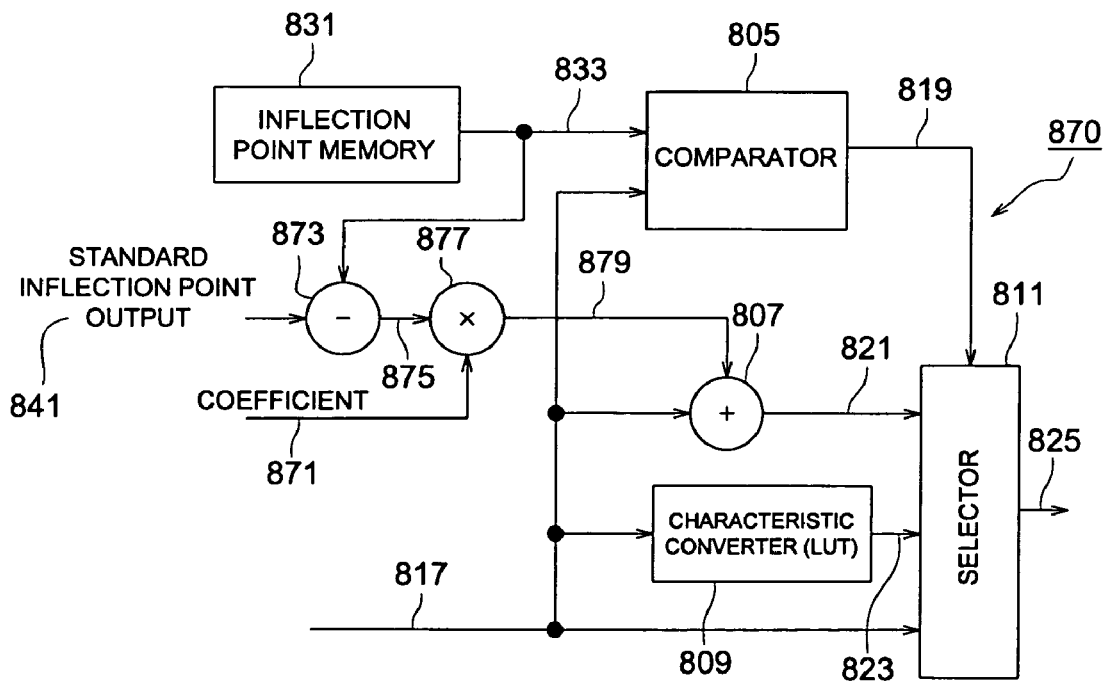

An inflection point variation correction section 860 shown in FIG. 10(a), in place of the offset value memory 801 shown in FIG. 9(a), is structured by an LUT, is provided with an offset value table 861 having a table of the offset value Vos according to the inflection point output Vthn, and outputs an offset value 863 according to inflection point output 833 of each pixel from the inflection point memory 831 from the offset value table 861. The others are the same as those shown in FIGS. 8(a) and 8(b). The memory capacity for storing the offset values can be reduced.

In an inflection point variation correction section 870 shown in FIG. 10(b), in place of the offset value memory 801 shown in FIG. 9(a), a subtracter 873 and a multiplier 877 are installed, and a difference 875 between the inflection point output 833 of each pixel from the inflection point memory 831 and inflection point output 841 of the standard characteristic is multiplied by a predetermined coefficient 871, and an offset value 879 of a pixel is calculated approximately. The others are the same as those shown in FIGS. 8(a) and 8(b). The coefficient in this case is desirably a coefficient in accordance with each offset value, though it may be a mean value of the coefficients. The approximation accuracy varies with the coefficient, though there is an advantage that the memory 801 is not required.

Also in the examples shown in FIGS. 9(a), 9(b), 10(a), and 10(b), similarly to the examples shown in FIGS. 8(a) and 8(b), the photoelectric conversion characteristic of a pixel explained in FIG. 6(a) is divided into three areas in relation to the standard characteristic and variations of the inflection point can be corrected in each area by an optimum method.

Figure 11A:
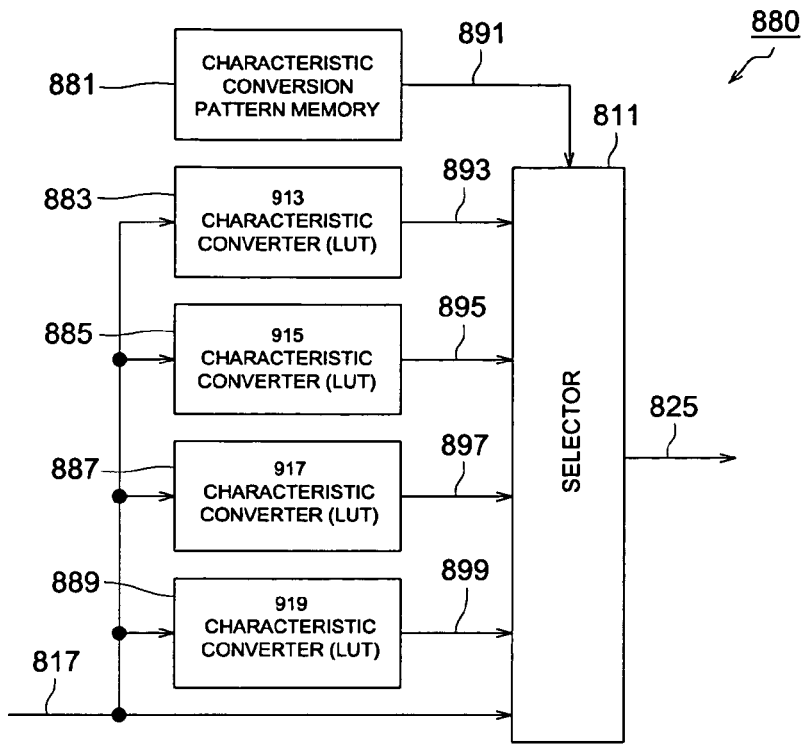
FIGS. 11(a) and 11(b) are a circuit block diagram showing a further example of the inflection point variation correction section and a schematic view of the photoelectric conversion characteristic for explaining the circuit block diagram.
Figure 11B:
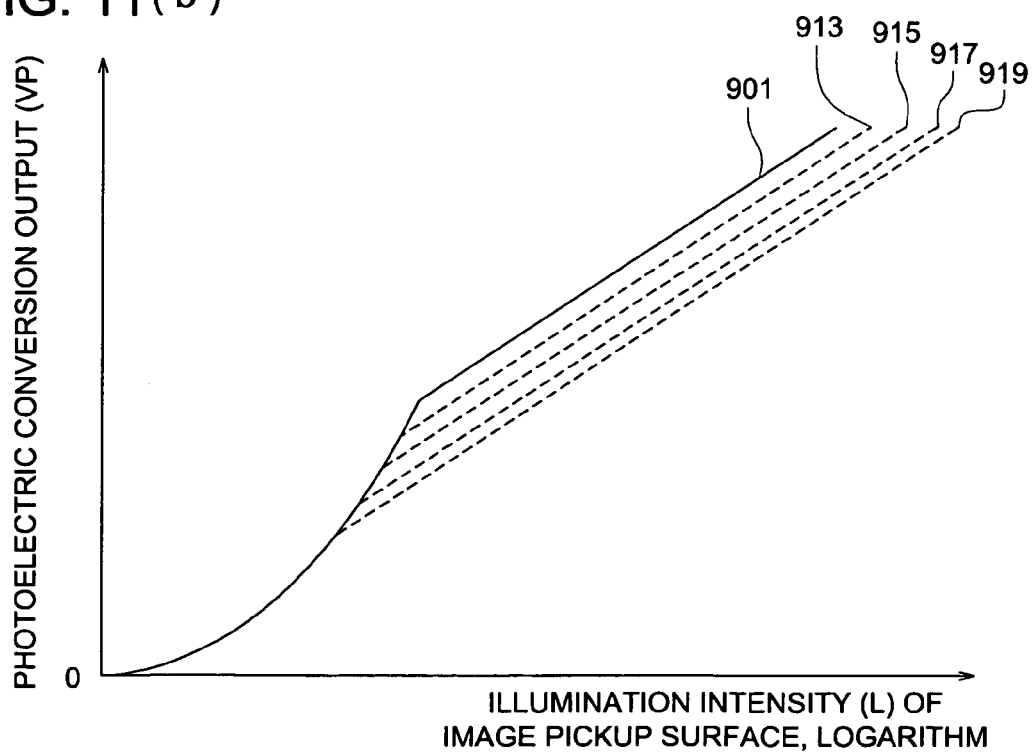

An inflection point variation correction section 880 shown in FIG. 11(a) is used when the inflection point variation amount is not large. The conception, as shown in FIG. 11(b), is that the interval between a standard characteristic 901 and a photoelectric conversion characteristic 919 having a maximum inflection point variation amount, for example, is divided into a plurality of photoelectric conversion characteristics (in this example, four cases 913, 915, 917, and 919) separated at even intervals with the allowable width of inflection point variation correction, and the photoelectric conversion characteristic of each pixel of the image pickup device 162 is classified into any pattern of the five cases of the four cases of photoelectric conversion characteristics and the standard characteristic and is stored in a characteristic transformation pattern memory 881 as characteristic transformation pattern information.

On the other hand, as a characteristic converter for fitting these four cases of photoelectric conversion characteristics (from 913 to 919) to the standard characteristic 901, four LUTs are prepared and are set respectively to a 913 characteristic converter 883, a 915 characteristic converter 885, a 917 characteristic converter 887, and a 919 characteristic converter 889. To these four characteristic converters, the imaged data 817 is input and respective characteristic transformation output (893, 895, 897, and 899) are input to the selector 811. The selector 811, for each pixel, switches the characteristic transformation output (893, 895, 897, and 899) of the four characteristic converters and the imaged data itself according to the characteristic transformation pattern information stored in the memory 881 and outputs them as an inflection point variation correction output 825.

In the methods shown in FIGS. 11(a) and 11(b), the correction precision is ensured and compared with FIGS. 8(a) and 8(b), calculators such as an adder and a comparator are not necessary, so that the processing is simplified and speeded up and the cost can be reduced.

Figure 12:
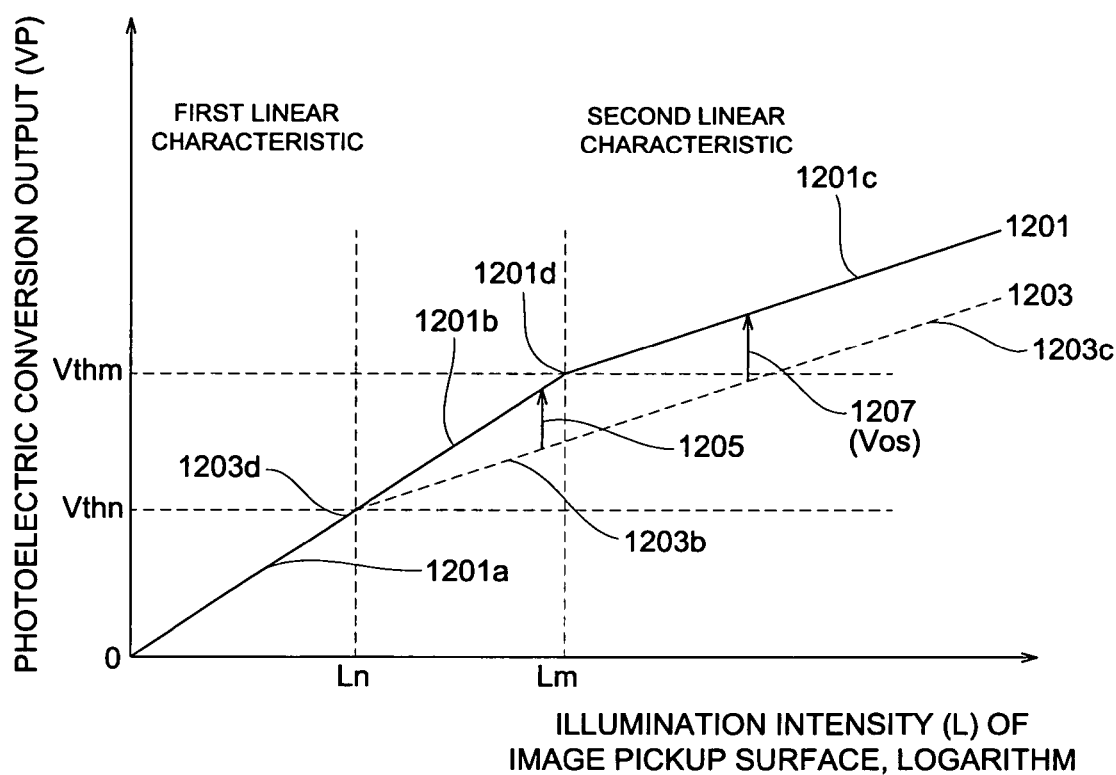
FIG. 12 is a schematic view showing the photoelectric conversion characteristic of the second embodiment of the image pickup device of the present invention.

Next, the second embodiment of the image pickup device of the present invention will be explained by referring to FIG. 12. FIG. 12 is a schematic view showing the photoelectric conversion characteristic of the second embodiment of the image pickup device 162 of the present invention.

The image pickup device 162 of this embodiment is one called a variable storage time type image pickup device or a variable storage capacity type image pickup device, which is an example of the so-called adaptive image pickup device (hereinafter, called the adaptive sensor). The photoelectric conversion characteristic of the adaptive sensor is linear characteristics (the first and second linear characteristics) on both low illumination intensity and high illumination intensity sides, though they are characteristics different in the inclination of linearity and have inflection points. The inflection points are controlled so as to be the same for all the pixels, though the inflection points are varied with variations in the parts, provided for each pixel, where the stored charge is detected.

Here, similarly to the case of the linear log sensor, a photoelectric conversion characteristic 1201 of the pixel having the greatest inflection point among all the pixels is decided as a standard characteristic and a photoelectric conversion characteristic 1203 of a pixel different in the inflection point is fit to the standard characteristic 1201. The fitting method, similarly to FIG. 6(a), performs the inflection point variation correction according to the three cases indicated below depending on the condition of the photoelectric conversion output VP of the photoelectric conversion characteristic 1203. (a) When VP is larger than or equal to the difference Vthm−Vos between the inflection point output Vthm of an inflection point 1201*d* of the standard characteristic 1201 and the offset value Vos, the offset Vos is added to the photoelectric conversion output VP (1207). (b) When VP is smaller than the difference Vthm–Vos between the inflection point output Vthm of the inflection point 1201*d* of the standard characteristic 1201 and the offset value Vos and larger than or equal to the inflection point output Vthn of an inflection point 1203*d* of the photoelectric conversion characteristic 1203, with Vthn as starting point, the inclination of the linear characteristic 1203*b* is transformed and is fit to a linear characteristic 1201*b* (1205). (c) When VP is smaller than the inflection point output Vthn of the inflection point 1203*d* of the photoelectric conversion characteristic 1203, a linear characteristic 1201*a* is kept as it is.

Figure 13:
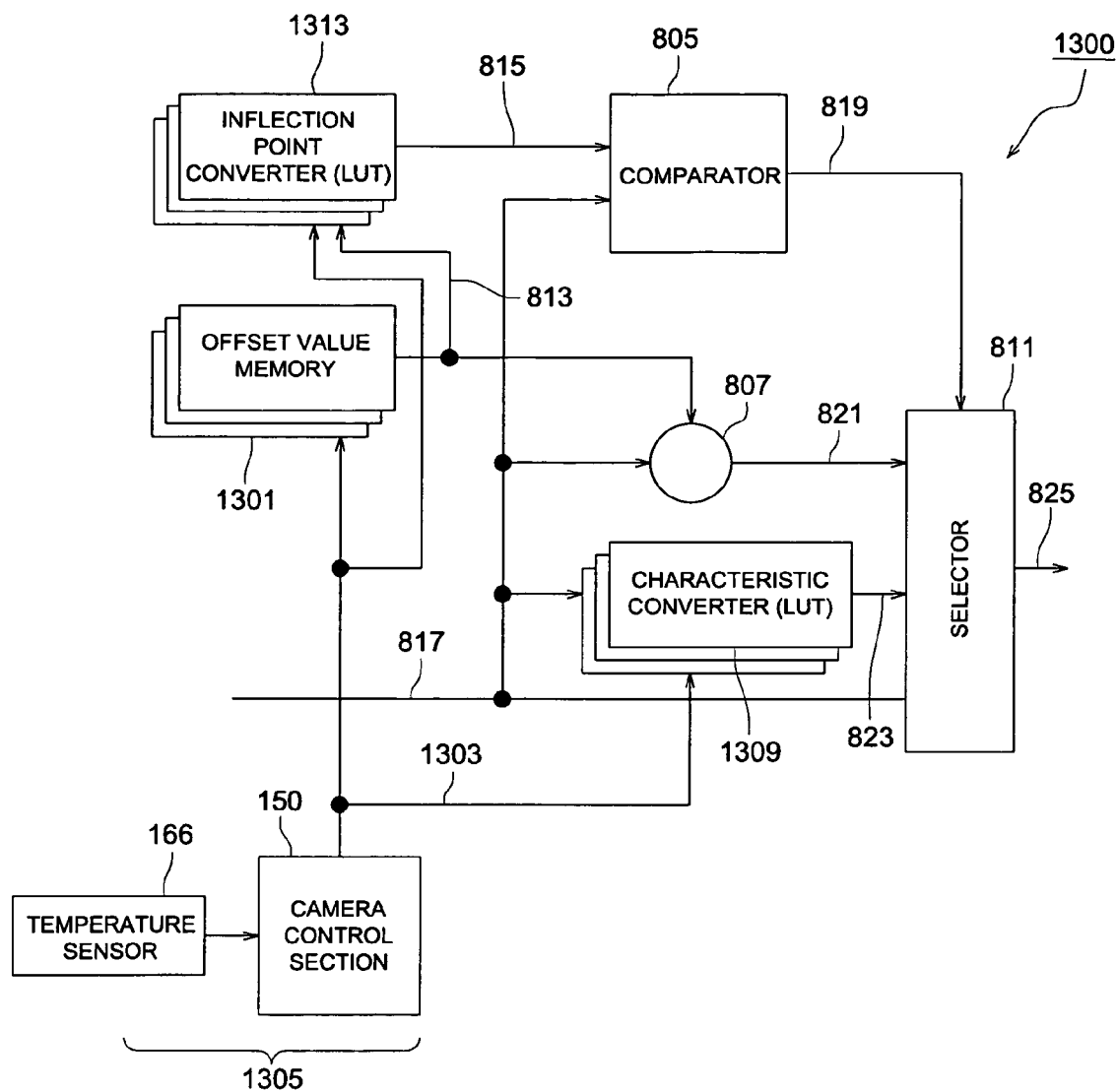
FIG. 13 is a circuit block diagram showing an example that a section for correcting a shift due to temperature is added to the inflection point variation correction section shown in FIGS. 8(a) and 8(b).
Figure 14:
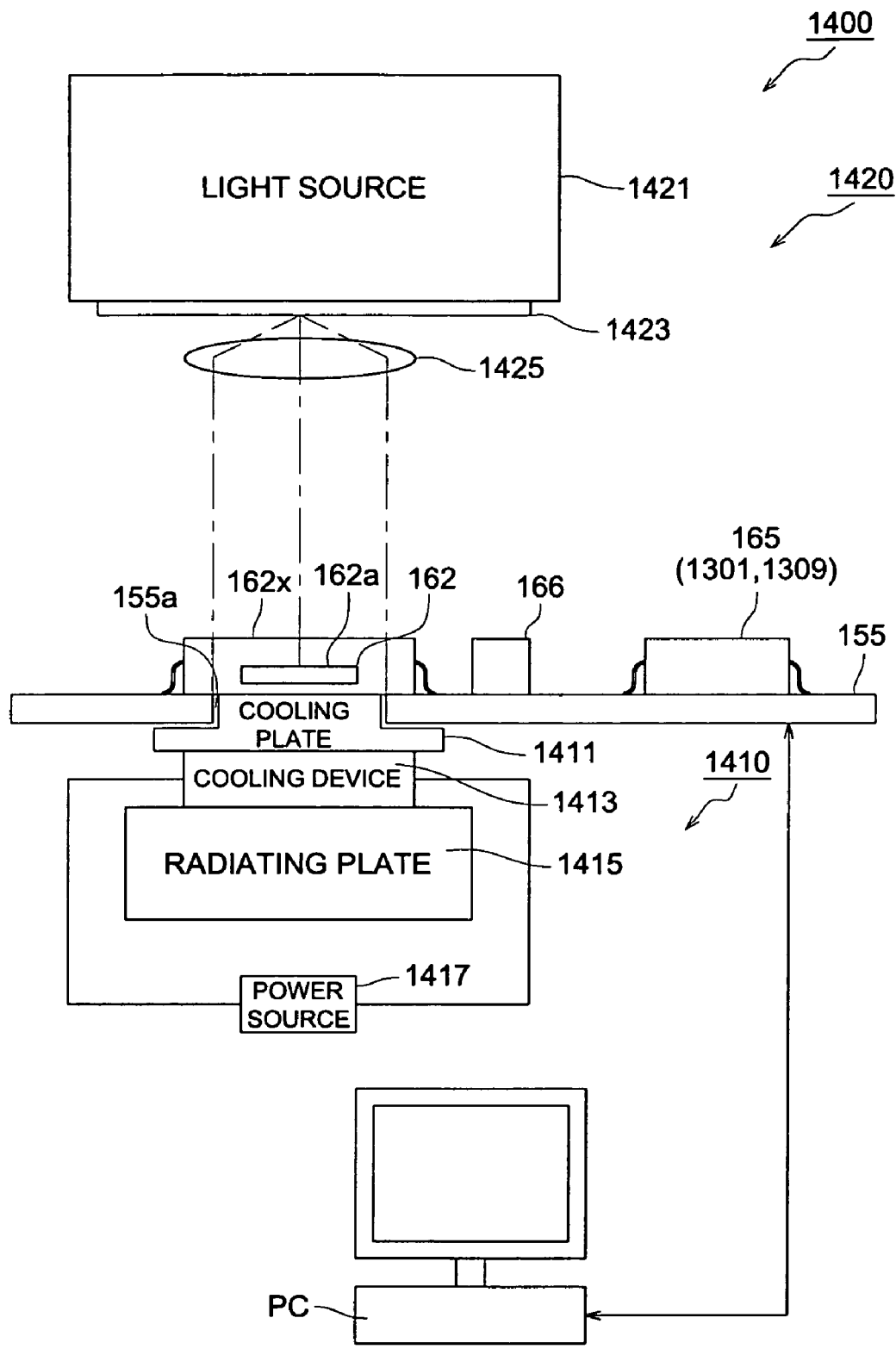
FIG. 14 is a schematic view showing an example of a method for obtaining correction data for temperature correction.

Next, a method for correcting a shift of inflection point variations due to temperature will be explained by referring to FIGS. 13 and 14. The inflection point not only varies for each pixel but also has a temperature characteristic mainly due to the temperature dependence of the characteristics of the transistor and capacitor composing the pixels. It is necessary to correct it. FIG. 13 is a circuit block diagram showing an example that a section for correcting a shift due to temperature is added to the inflection point variation correction section 800 shown in FIGS. 8(*a*) and 8(*b*). FIG. 14 is a schematic view showing an example of a method for obtaining correction data for temperature correction. In the drawing, to the same parts as those shown in FIGS. 2, 7(*a*), 7(*b*), 8(*a*), and 8(*b*), the same numbers are assigned.

Firstly, in an inflection point variation correction section 1300 shown in FIG. 13, the temperature sensor 166 is arranged in the neighborhood of the image pickup device 162 and detects the temperature of the image pickup device 162 or the temperature in the neighborhood of the image pickup device 162 in the digital camera 1. A temperature detection section 1305 structured by the temperature sensor 166 and camera control section 150 outputs a temperature signal 1303. An offset value memory 1301 equivalent to the offset memory 801 shown in FIGS. 8(*a*) and 8(*b*) stores the offset values Vos of all the pixels of the image pickup device 162 at a plurality of temperatures obtained by a method which will be described later in FIG. 14 and according to a temperature signal 1303, selects an offset value Vos at an appropriate temperature and outputs the offset output 813. When setting offset values for the temperature in detail, it is desirable to increase the number of temperatures to be stored or calculate an offset value at the intermediate temperature by the interpolation calculation between the offset values Vos at each temperature. The offset value memory 1301 functions also as a correction data modification section of the present invention.

An inflection point converter 1313 is equivalent to the inflection point converter 803 shown in FIGS. 8(*a*) and 8(*b*), is structured by an LUT, stores the offset values Vos at a plurality of temperatures obtained by the method explained in FIGS. 6(*a*) and 6(*b*) and the table of the inflection point output Vthn, selects an appropriate table according to the temperature signal 1303, and outputs the inflection point output 815 according to the offset value 813 corrected in temperature. By doing this, the inflection point 815 is also corrected in temperature and the comparison output 819 of the comparator 805 is also corrected in temperature. Further, to the adder 807, the offset value 813 corrected in temperature is input, thus the offset correction output 821 is also corrected in temperature.

On the other hand, a characteristic converter 1309 equivalent to the characteristic converter 809 shown in FIGS. 8(*a*) and 8(*b*) is structured by an LUT, similarly to the memory 1301, stores the characteristic transformation tables of the photoelectric conversion characteristic of all the pixels of the image pickup device 162 at the plurality of temperatures obtained by the method which will be described later in FIG. 14, and according to the temperature signal 1303, selects an appropriate table, and outputs the characteristic transformation output 823 transformed in characteristic. By doing this, the characteristic transformation output 823 is corrected in temperature. The characteristic converter 1309 functions also as a characteristic transformation modification section of the present invention. The other circuit operations are the same as those shown in FIGS. 8(*a*) and (*b*), so that the explanation thereof will be omitted.

Therefore, in the selector 811, any output of the imaged data 817 at a certain temperature, the offset correction output 821 corrected in temperature, and the characteristic transformation output 823 corrected in temperature is selected on the basis of the comparison output 819 corrected in temperature and is outputted as inflection point variation correction output 825, thus the inflection point variation temperature characteristic is corrected.

FIG. 14 is a schematic view showing an example of a method for obtaining correction data for temperature correction. As mentioned above, the inflection point variation temperature characteristic is generated mainly due to the temperature dependence of the characteristics of the transistor and capacitor composing the pixels, so that it can be thought to calculate it theoretically as a temperature coefficient. However, here, a method for actually changing the temperature of the image pickup device 162 and obtaining the offset value Vos and LUT of characteristic converter at a certain temperature from the output of the image pickup device 162 at that time will be explained.

The image pickup device 162 stored in a package 162*x*, the temperature sensor 166 installed in the neighborhood of the image pickup device 162 for detecting the temperature of the image pickup device 162, and the image processing section 165 internally having the area of the offset value memory 1301 and characteristic converter 1309 are mounted on the image pickup device substrate 155 and on the image pickup device substrate 155, a hole 155*a* is formed at the position corresponding to the rear of the image pickup device 162.

A temperature characteristic detector 1400 is structured by a light source unit 1420 including a light source box 1421 arranged at the upper part, a light source surface 1423, and a projection lens 1425, a cooling device 1413 arranged at the lower part such as a Peltier device held between a metallic cooling plate 1411 and a radiating plate 1415, a cooling unit 1410 including a power source 1417 for driving the cooling device 1413, and a controller for a personal computer PC externally installed.

As is generally known, in the cooling device such as a Peltier device, when a current flows in one direction, one surface thereof is cooled and the other surface is heated. When the current direction is reversed, the cooling surface and heating surface are reversed. Therefore, when the hole 155*a* of the image pickup device substrate 155 is inserted into the upper part of the cooling plate 1411 and the cooling device 1413 is driven to be cooled or heated, the image pickup device 162 is cooled or heated by the cooling device 1413.

When the light source box 1421 is turned on, and the brightness of the light source surface 1423 is projected onto the image pickup surface 162*a* of the image pickup device 162 via the projection lens 1425, and the temperature of the image pickup device 162 cooled or heated by the cooling device 1413 is detected by the temperature sensor 166, and the temperature and imaged data of the image pickup device 162 at that time are calculated, for example, by the external PC, the offset value Vos at a certain temperature and characteristic converter table are obtained and furthermore, when an LUT of the inflection point converter 1313 is generated by the method explained in FIGS. 6(*a*) and 6(*b*), and the value is written into the offset value memory 1301, characteristic converter 1309, and inflection point converter 1313 inside the image processing section 165, the correction data for temperature correction can be obtained. The brightness of the light source, as explained in FIG. 7(*a*), must be bright enough to make at least all the pixels have a logarithmic characteristic, though it is desirable to prepare several other different brightness.

According to this method, the temperature of the image pickup device 162 is actually changed and the temperature correction data is calculated using the imaged data at the temperature, so that correction data on which a precise temperature characteristic is reflected can be obtained.

In this embodiment, the cooling device 1413 is used to change the temperature of the image pickup device 162. However, the present invention is not limited to it and for example, it is possible to continuously supply power to the parts (for example, the power source section and output section) using a large consumption current on the image pickup device 162 and change the temperature of the image pickup device 162 by the consumption power.

Further, to detect the temperature of the image pickup device 162, the temperature sensor 166 is installed outside the image pickup device 162. However, the present invention is not limited to it and it is possible to install a temperature detection circuit on the image pickup device 162 or to calculate the temperature of the image pickup device 162 from changes in the inclination of a plurality of logarithmic characteristic parts different in brightness of the imaged data of the image pickup device 162. The reason is that the logarithmic characteristic has theoretically a characteristic of $VP=kT/q \cdot \ln(IPD)$ (where k indicates Boltzmann constant, T an absolute temperature, q a unit charge of an electron, VP photoelectric conversion output, and IPD an optical current by the PD section), so that the temperature T can be calculated from the imaged data of a logarithmic characteristic part different in brightness.

As mentioned above, according to the embodiments of the present invention, on the basis of the inflection point of the standard photoelectric conversion characteristic and correction data, whether or not to execute a correction using the correction data to the imaged data of the pixels and whether or not to execute characteristic transformation using the characteristic transformation section to the imaged data of the pixels are decided, and on the basis of it, inflection point variations are corrected by an appropriate method, thus an image pickup apparatus contributing to realization of high image quality can be provided. Further, the inflection point variation temperature characteristic can be corrected by the similar method and an image pickup apparatus contributing to realization of high image quality can be provided.

Further, the detailed constitution and detailed operation of each component composing the image pickup apparatus relating to the present invention can be modified properly without departing from the aspect and spirit of the present invention.

What is claimed is:

1. An image pickup apparatus, comprising:
 an image pickup device having a plurality of pixels which have a plurality of different photoelectric conversion characteristics different from each other on each side of an inflection point; and
 a characteristic variation correction section which corrects an error of the photoelectric conversion characteristic of the pixels, the error being a distance from standard photoelectric conversion characteristic,
 wherein the characteristic variation correction section includes:
 a correction data storing section which stores correction data;
 an error correction section which corrects the imaged data by using the correction data;
 a characteristics transformation section which transforms imaged data converted by one of the different photoelectric conversion characteristics into imaged data fitted to another of the different photoelectric conversion characteristics;
 an correction manner decision section which decides, based on an inflection point of the standard photoelectric conversion characteristic and the correction data, whether the imaged data is corrected by using the correction data or not and whether the imaged data is transformed by using the characteristics transformation section or not.

2. The image pickup apparatus of claim 1, wherein the characteristic variation correction section comprises an adder for adding the correction data.

3. The image pickup apparatus of claim 1, wherein the characteristic variation correction section comprises a look-up table for transforming the imaged data.

4. The image pickup apparatus of claim 1, the correction data is a difference between an imaged data converted by the standard photoelectric conversion characteristic and an imaged data of the pixels at a luminance where the imaged data is not saturated and all of the pixels operate on the photoelectric conversion characteristics of the brightest side of the different photoelectric conversion characteristics.

5. The image pickup apparatus of claim 1, comprising:
 a correction data generation section which generates the correction data based on the imaged data outputted by the pixels.

6. The image pickup apparatus of claim 1, comprising:
 a temperature detection section which detects a temperature of the image pickup device or the image pickup apparatus; and
 a correction data modification section which modifies the correction data based on a detection result of the temperature detection section.

7. The image pickup apparatus of claim 1, comprising:
 a temperature detection section which detects a temperature of the image pickup device or the image pickup apparatus; and
 a characteristics transformation modification section which modifies a characteristics transformation output of the characteristics transformation section based on a detection result of the temperature detection section.

8. A characteristic variation correction apparatus, in an image processing apparatus in which imaged data from a image pickup device including a plurality of pixels having a plurality of different photoelectric conversion characteristics different from each other on each side of an inflection point, for correcting an error of the photoelectric conversion characteristic of the pixels, the error being a distance from standard photoelectric conversion characteristic, comprising:
 a correction data storing section which stores correction data;
 an error correction section which corrects the imaged data by using the correction data;

a characteristics transformation section which transforms imaged data converted by one of the different photoelectric conversion characteristics into imaged data fitted to another of the different photoelectric conversion characteristics;

an correction manner decision section which decides, based on an inflection point of the standard photoelectric conversion characteristic and the correction data, whether the imaged data is corrected by using the correction data or not and whether the imaged data is transformed by using the characteristics transformation section or not.

9. The characteristic variation correction apparatus of claim 8, comprising:
an adder for adding the correction data.

10. The characteristic variation correction apparatus of claim 8, comprising:
a look-up table for transforming the imaged data.

11. The characteristic variation correction apparatus of claim 8, the correction data is a difference between an imaged data converted by the standard photoelectric conversion characteristic and an imaged data of the pixels at a luminance where the imaged data is not saturated and all of the pixels operate on the photoelectric conversion characteristics of the brightest side of the different photoelectric conversion characteristics.

12. The characteristic variation correction apparatus of claim 8, comprising:
a correction data generation section which generates the correction data based on the imaged data outputted by the pixels.

13. The characteristic variation correction apparatus of claim 8, comprising:
a temperature detection section which detects a temperature of the image pickup device or the image pickup apparatus; and a correction data modification section which modifies the correction data based on a detection result of the temperature detection section.

14. The characteristic variation correction apparatus of claim 8, comprising:
a temperature detection section which detects a temperature of the image pickup device or the image pickup apparatus; and a characteristics transformation modification section which modifies a characteristics transformation output of the characteristics transformation section based on a detection result of the temperature detection section.

15. A data processing method of imaged data, comprising the steps of:
imaging by using an image pickup device including a plurality of pixels having a plurality of different photoelectric conversion characteristics differ from each other on each side of an inflection point; and correcting an error between the photoelectric conversion characteristics of the pixels and a standard photoelectric conversion characteristic, wherein the step of correcting an error includes the steps of:
correcting the imaged data of the pixels using correction data;

transforming imaged data of the pixels converted by one of the different photoelectric conversion characteristics to imaged data fitted to another of the different photoelectric conversion characteristics; and deciding, based on an inflection point of the standard photoelectric conversion characteristic and the error correction data, whether the imaged data is corrected by using the error correction data or not and whether the imaged data is transformed or not.

* * * * *